(12) United States Patent
Onishi et al.

(10) Patent No.: US 11,734,201 B2
(45) Date of Patent: Aug. 22, 2023

(54) CONTROL SYSTEM

(71) Applicant: HITACHI, LTD., Tokyo (JP)

(72) Inventors: Kazutaka Onishi, Tokyo (JP); Yusaku Otsuka, Tokyo (JP); Tatsuya Maruyama, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 17/794,248

(22) PCT Filed: Oct. 9, 2020

(86) PCT No.: PCT/JP2020/038321
§ 371 (c)(1),
(2) Date: Jul. 20, 2022

(87) PCT Pub. No.: WO2021/157134
PCT Pub. Date: Aug. 12, 2021

(65) Prior Publication Data
US 2023/0098444 A1    Mar. 30, 2023

(30) Foreign Application Priority Data
Feb. 4, 2020  (JP) .................................. 2020-017325

(51) Int. Cl.
*G06F 13/10* (2006.01)
(52) U.S. Cl.
CPC .................................. *G06F 13/102* (2013.01)
(58) Field of Classification Search
None
See application file for complete search history.

(56) References Cited

U.S. PATENT DOCUMENTS

2017/0163726 A1* 6/2017 Compton ............ G06F 11/2069

FOREIGN PATENT DOCUMENTS

| JP | 2007148814 A | 6/2007 |
|----|--------------|--------|
| JP | 2009093375 A | 4/2009 |
| JP | 2017062758 A | 3/2017 |
| JP | 2018041405 A | 3/2018 |
| JP | 2019016170 A | 1/2019 |

OTHER PUBLICATIONS

International Search Report of PCT/JP2020/038321 dated Nov. 24, 2020.
Japanese Office Action dated Jun. 21, 2022 corresponding to Japanese Patent Application No. 2020-017325.

* cited by examiner

*Primary Examiner* — Scott C Sun
(74) *Attorney, Agent, or Firm* — Mattingly & Malur, PC

(57) ABSTRACT

In a control system including one or more control nodes and one or more I/O nodes connected to one or more devices and communicable with the control nodes, the control nodes execute at least one control program on a first OS, and the I/O nodes execute at least one I/O program on a second OS with higher punctuality. The control program generates a control command based on state control set in advance for the device and transmits the control command to the I/O node. The I/O program stores the control command received from the control node in a storage unit, and executes processing related to the device according to the control command stored in the storage unit.

12 Claims, 37 Drawing Sheets

FIG. 4

| TRANSMISSION DATA | | | | 83 |
|---|---|---|---|---|
| 83a | TRANSMISSION SOURCE | 192.168.0.10:8080 | | |
| 83b | TRANSMISSION DATA AND TIME | 2019-09-12 00:00:01.000 | | |
| 83c | COMMAND ID | 1 | | |
| 83d | DATA | TARGET | VARIABLE Y | |
| | | VALUE | 3.7V | |

FIG. 14

[CONTROL PROGRAM MANAGEMENT TABLE]                               15F

| CONTROL PROGRAM ID | SAVING DESTINATION | TYPE | NUMBER OF CONFIGURATIONS |
|---|---|---|---|
| 1 | C:¥ctrl-prg.exe | REDUNDANT | 2 |

[CONTROL PROGRAM MANAGEMENT TABLE]                               15G

| CONTROL NODE ID | MASTER/SLAVE | EXECUTION CONTROL PROGRAM ID | EXECUTABILITY |
|---|---|---|---|
| 1 | MASTER | 1 | IMPOSSIBLE |
| 2 | SLAVE | 1,2 | IMPOSSIBLE |
| 3 | SLAVE | ⟨BLANK⟩ | POSSIBLE |

[TRANSMISSION SOURCE LIST] 87C

| TRANSMISSION SOURCE | ORDER |
|---|---|
| 192.168.0.10:8080 | 1 |
| 192.168.0.11:8080 | 2 |

[SCALE-OUT CONFIGURATION TABLE] 89

| TRANSMISSION SOURCE | ORDER |
|---|---|
| 192.168.0.10:8080 | 1 |
| 192.168.0.11:8080 | 2 |

89a, 89b

CONTROL SYSTEM

TECHNICAL FIELD

The present invention relates to a control system that performs control using a computer, for example, in the fields of factory automation (FA) and process automation (PA).

BACKGROUND ART

In general, in the fields of factory automation (FA) and process automation (PA), a control system using a computer is introduced in a manufacturing process in a factory or the like, a production process of a chemical product or the like, or the like. The control system performs control by a computer such as a programmable logic controller (PLC) executing a computer program.

An outline of processing of such a control system will be described. The computer acquires information necessary for control, such as temperature, pressure, and rotational speed, from a sensor. The computer operates an actuator, a motor, and the like based on the information. A content to be controlled is defined in a program, and the computer performs control by executing the program. The control needs to be performed at an appropriate timing, and the performance or degree that can be controlled at the appropriate timing is referred to as "punctuality".

For example, PTL 1 discloses a plant control system in which sequential control logic (various determinations and the like) is executed by a PLC, complex arithmetic processing (numerical operation such as convergence operation) is executed on a general-purpose OS, and functions to be processed are allocated.

CITATION LIST

Patent Literature

PTL 1: JP 2009-093375 A

SUMMARY OF INVENTION

Technical Problem

In recent years, there is development of artificial intelligence technology represented by automatic driving of automobiles. In the field of artificial intelligence technology, it is required to introduce advanced determination processing by complex calculation processing such as deep learning inference processing into a control system. The implementation of this determination processing has the following problems.

(Problem 1)

The control system needs to perform control with high punctuality. PLC and the like ensure punctuality by executing programs on a real-time operating system (OS) with high punctuality. The real-time OS has functions and characteristics for executing processing with time constraints. Meanwhile, a program that performs complicated processing such as inference processing may be developed on the premise of execution on a general-purpose OS, and it is difficult to execute the program on a real-time OS.

(Problem 2)

In a manufacturing process of a factory or the like, equipment may continue to operate for several months to several years, and it is assumed that the control system is not stopped. Meanwhile, in order to add a new function to the control system, it is necessary to temporarily stop the control system. In addition, even in a case where software or hardware constituting the control system needs to be replaced due to aging, the control system cannot be frequently stopped, and the replacement may be delayed.

As described above, the control system is required to continue to operate. Therefore, the control system is configured to be redundant by using two or more computers, and the operation of the control system is continued even when one computer fails. At this time, the program executed by each computer needs to be synchronized in timing and information with the programs of another computer, and have performance that does not impair punctuality even at the time of failure, and thus has a high degree of difficulty.

Patent Literature 1 does not disclose a technique for changing a program, a computer, or the like of a control system while the control system requiring such high punctuality is operated.

The present invention has been made in view of the above circumstances, and an object of the present invention is to enable change of resources used in a control system without stopping the control system while maintaining punctuality.

Solution to Problem

In order to solve the above problem, a control system according to one aspect of the present invention includes at least one control node and at least one I/O node that is connected to one or more control target devices and is communicable with the control node via a network.

The control node includes a first operating system and a first processor that executes at least one control program on the first operating system.

The I/O node includes a second operating system having higher punctuality than the first operating system, and a second processor that executes at least one I/O program on the second operating system.

The control program for the control node includes a determination execution unit that generates a control command based on state control set in advance for the control target device and transmits the control command to the I/O node.

The I/O program of the I/O node includes a control command execution unit that stores a control command received from the control node in a storage unit and executes processing related to the control target device according to the control command stored in the storage unit.

Advantageous Effects of Invention

According to at least one aspect of the present invention, it is possible to change a resource used in a control system without stopping the control system while maintaining punctuality.

Objects, configurations, and effects other than those described above will be clarified by the following description of an embodiment.

BRIEF DESCRIPTION OF DRAWINGS

FIG. 4 is a table illustrating an example of information included in transmission data.

FIG. 14 is a table illustrating an example of a structure of a control program management table used by a configuration management program.

FIG. 15 is a table illustrating an example of a structure of a control node management table used by a configuration management program.

FIG. 35 is a table illustrating an example of a structure of a transmission source list.

FIG. 36 is a table illustrating an example of a structure of a scale-out configuration table.

DESCRIPTION OF EMBODIMENTS

Figure 1:
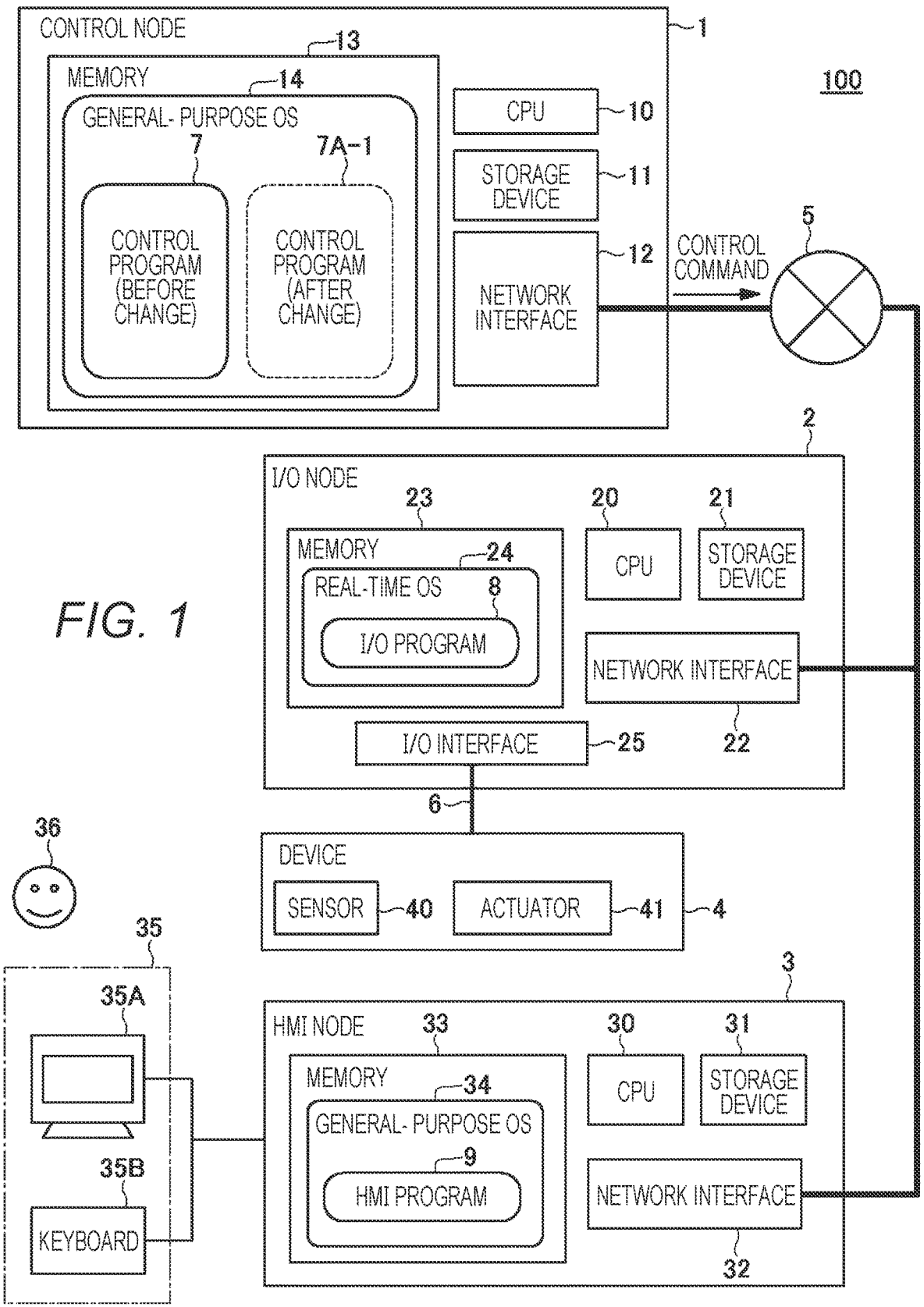
FIG. 1 is a block diagram illustrating an example of an overall configuration of a control system according to a first embodiment of the present invention.

Hereinafter, embodiments of the present invention will be described with reference to the accompanying drawings. In the present specification and the drawings, components having substantially the same function or configuration are denoted by the same reference numerals, and repeated descriptions thereof are omitted.

1. First Embodiment

[Overall Configuration of Control System]

First, a configuration example of a control system according to a first embodiment of the present invention will be described.

FIG. 1 is a block diagram illustrating an example of an overall configuration of the control system according to the first embodiment.

The control system 100 illustrated in FIG. 1 includes a control node 1, an I/O node 2, an HMI node 3, a control target device 4, and a network 5 in which the nodes are communicably connected to each other. In the control system 100, the number of control nodes 1 is at least one or more, and the number of I/O nodes 2 is also at least one or more.

The device 4 is, for example, a device used as a production facility of a factory, and a target of the control system 100 is to cause the device 4 to perform a desired operation. The device 4 includes a sensor 40 and an actuator 41. Although only one sensor 40 and one actuator 41 are illustrated in FIG. 1, actually, there may be a plurality of sensors or only one of the sensor 40 and the actuator 41.

The sensor 40 is a device for grasping the state of the device 4 and the surrounding environment. The actuator 41 is a device for causing the device 4 to perform an actual operation or change the operation. Examples of the sensor 40 include a thermometer, a flow meter, a voltmeter, a switch, a video camera, a counter, and the like. Examples of the actuator 41 include a motor, a cylinder, an electromagnet, a relay, an LED, a lamp, a buzzer, and the like. As a matter of course, the sensor 40 and the actuator 41 are not limited to the examples described above.

The control node 1 is a computer including a central processing unit (CPU) 10, a storage device 11 (an example of a storage unit), a network interface 12, and a memory 13. The CPU 10 is an example of a first processor. Instead of the CPU 10, another processor such as a micro processor (MPU) may be used. The memory 13 is a main storage device using a semiconductor memory or the like. The storage device 11 is a nonvolatile storage device, and a hard disk, a semiconductor memory, or the like is used as the storage device 11, for example.

Similarly, the I/O node 2 is a computer including a CPU 20 (first processor), a storage device 21 (an example of a storage unit), a network interface 22, and a memory 23. The HMI node (Human Machine Interface) 3 is a computer including a CPU 30, a storage device 31, a network interface 32, and a memory 33.

In the control node 1, the CPU 10 reads and executes a general-purpose OS 14 (first operating system) from the storage device 11 onto the memory 13. The CPU 10 executes one or more control programs 7 on the general-purpose OS 14. The storage device 11 stores various tables and the like to be described later.

In the I/O node 2, the CPU 20 reads and executes a real-time OS 24 (second operating system) from the storage device 21 onto the memory 23. The CPU 20 executes an I/O program 8 on the real-time OS 24. The storage device 21 stores a transmission source list 87 and the like to be described later. The I/O node 2 further includes an I/O interface 25, and is connected to the device 4 via a cable 6.

As a specific example of the cable 6 connecting between the I/O interface 25 and the device 4 and a communication method between the cable 6 and the device 4, a method of directly wiring the device 4 via a screw terminal or a method of performing communication by the device 4 according to a prescribed protocol via an interface of the device 4 is assumed. In the present embodiment, any method may be used as long as latency (delay) is small and communication with the sensor 40 and the actuator 41 of the device 4 is possible. Specific examples of the standard used for communication include universal serial bus (USB), RS-232, and Ethernet (registered trademark), and can also be realized by wireless communication using Bluetooth (registered trademark) or the like.

In the HMI node 3, the CPU 30 reads a general-purpose OS 34 from the storage device 31 onto the memory 33 and executes the general-purpose OS. The CPU 30 executes an HMI program 9 on the general-purpose OS 34. In addition, the HMI node 3 includes a user interface 35 such as a display 35A and a keyboard 35B.

The control node 1, the I/O node 2, and the HMI node 3 are connected to the network 5 through respective network interfaces 12, 22, and 32. Specific examples of the communication scheme of the network 5 include Ethernet (registered trademark), a controller area network (CAN) (registered trademark), and the like. Through the network 5, the control program 7, the I/O program 8, and the HMI program 9 communicate with each other using a protocol such as UDP over IP capable of one-to-one and one-to-many communication.

The control node 1 and the I/O node 2 realize control of the device 4 by processing of the control program 7 and the I/O program 8 executed by the respective CPUs. Hereinafter, functional configurations of the control program 7 and the I/O program 8 will be described with reference to FIG. 2.

[Logic Configuration of Control Program and I/O Program]

Figure 2:
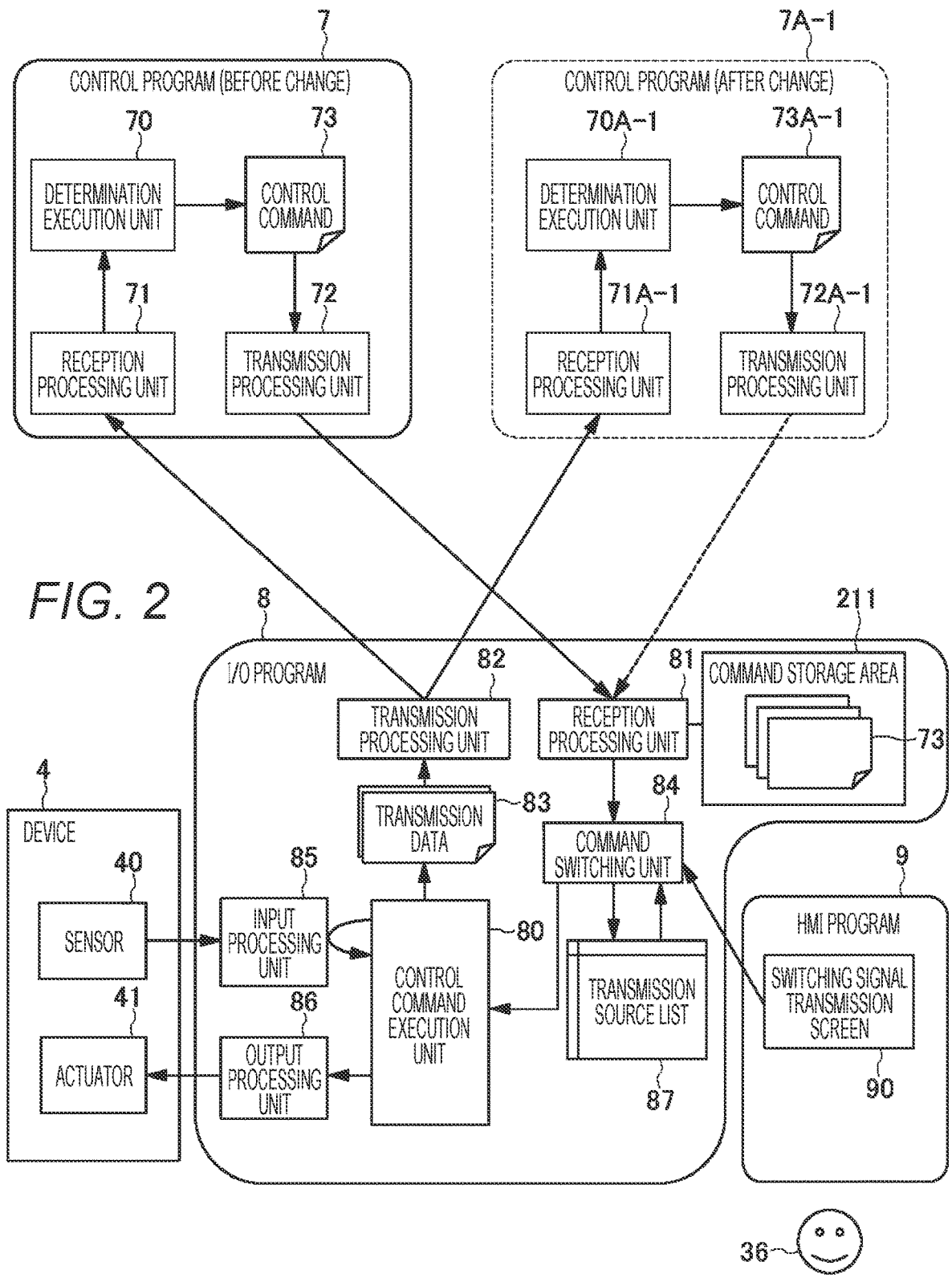
FIG. 2 is a block diagram illustrating an example of a logical configuration of a control program and an I/O program of the control system according to the first embodiment of the present invention.

FIG. 2 is a block diagram illustrating an example of logical configurations of the control program 7 and the I/O program 8 of the control system 100.

The control program 7 includes a determination execution unit 70, a reception processing unit 71, and a transmission processing unit 72. The function of each unit of the control program 7 will be described later.

The I/O program 8 includes a control command execution unit 80, a reception processing unit 81, a transmission processing unit 82, a command switching unit 84, an input processing unit 85, an output processing unit 86, and a transmission source list 87. The input processing unit 85 acquires information (detection result) from the sensor 40, and the output processing unit 86 transmits a control signal to the actuator 41 to operate the actuator 41. The function of each unit of the I/O program 8 will be described later.

The HMI program 9 has a plurality of screens for an administrator 36 of the control system 100 to set and confirm the state of the control system 100. The screen is implemented as a graphical user interface (GUI), and is operated by the administrator 36 of the control system 100 via the user interface 35. FIG. 2 illustrates a state in which the HMI program 9 transmits a switching signal generated by the switching signal transmission screen 90 to the command switching unit 84 of the I/O program 8. The switching signal transmission screen 90 will be described later in detail with reference to FIG. 11. The command switching unit 84 registers transmission source information of a received control command 73 in the transmission source list 87.

The control command 73 is a message generated by the determination execution unit 70 of the control program 7, and includes an instruction on what kind of processing and operation is to be performed under a specific condition. For example, in plain expression, the control command 73 includes contents such as "transmit a voltage value of the sensor 40 to the control program 7 every 30 milliseconds", "operate the actuator 41 for Y milliseconds at the timing of time X", and "calculate a moving average of the voltage value of the sensor 40".

The control command 73 transmitted from the control program 7 to the I/O program 8 is sequentially received by the reception processing unit 81 of the I/O program 8. The reception processing unit 81 sequentially stores the received control command 73 in a command storage area 211 of the storage device 21 (storage unit).

Transmission data 83 is a message that is generated by the control command execution unit 80 of the I/O program 8 in accordance with the control command 73 and describes information to be transmitted to the determination execution unit 70 of the control program 7. For example, the transmission data 83 includes a voltage value of the sensor 40, a value calculated by the control command execution unit 80, and the like. The determination execution unit 70 acquires necessary information such as the state of the device 4 by receiving the content of the transmission data 83.

Figure 3:
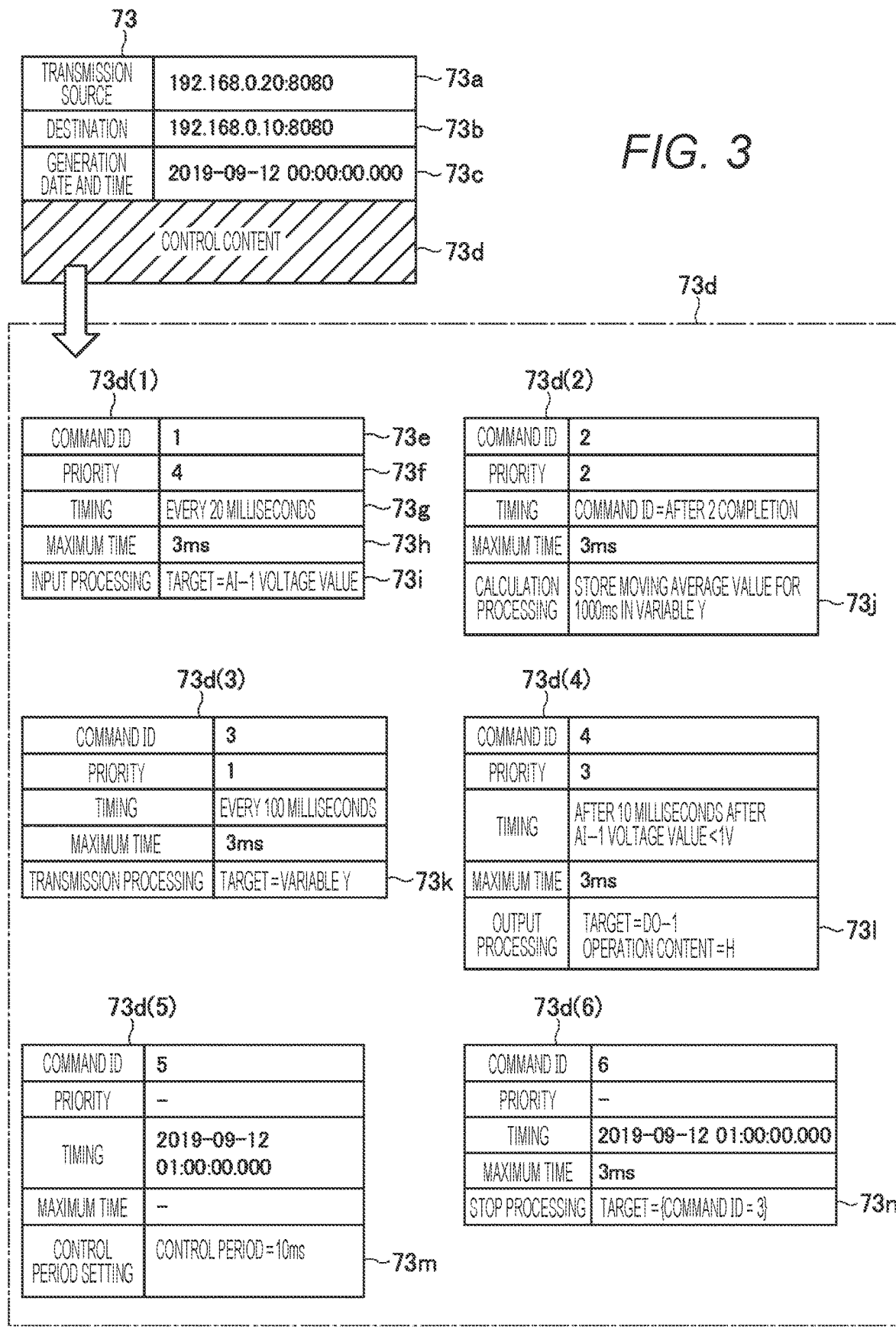
FIG. 3 is a table illustrating an example of information included in a control command.

FIG. 3 is a table illustrating an example of information included in the control command 73.

The control command 73 includes a transmission source column 73a, a destination column 73b, a generation date and time column 73c, and a control content column 73d.

The transmission source column 73a stores an IP address and a port number for specifying the control program 7 that has generated the control command 73.

The destination column 73b stores an IP address and a port number specifying the I/O program 8 to execute the control program.

The generation date and time column 73c stores the date and time when the control command 73 is generated.

The control content column 73d stores the content of control of the control command 73.

The control content column 73d has different contents for each control command 73, but has a command ID column 73e, a priority column 73f, a timing column 73g, and a maximum time column 73h in common.

The command ID column 73e holds a command ID uniquely specifying the control command 73. The command ID is assigned by the determination execution unit 70 when the control command 73 is generated.

The priority column 73f holds the priority of the control command 73. When the priority column 73f is blank, it indicates that the priority is the lowest.

The timing column 73g holds the timing at which the processing described in the control content column 73d is to be executed. The contents of the timing can be specified in various cases such as a case where the timing is periodically executed at regular intervals, a case where conditions such as the state of the sensor are satisfied, and a case where a specified time has come.

The maximum time column 73h holds a maximum time (FIG. 8 to be described later) that can be allowed for processing of one control command 73. When the maximum time column 73h is blank, it indicates that the maximum time is not set.

Control content columns 73d(1) to 73d(6) illustrate specific examples of the control content for each process to be performed.

The control content column 73d(1) is an example of a case where input processing, that is, information acquisition from the sensor 40 is performed. The control content column 73d(1) includes an input processing column 73i and holds a target for acquiring information.

The control content column 73d(2) is an example of a case where calculation processing, that is, calculation processing such as a moving average of output values of the sensor 40 is performed. The control content column 73d(2) includes a calculation processing column 73j and holds the content of the calculation processing.

The control content column 73d(3) is an example of a case where the transmission processing, that is, the information is transmitted to the control program 7. The control content column 73d(3) includes a transmission processing column 73k and holds a transmission target.

The control content column 73d(4) is an example of a case where output processing, that is, operation of an actuator or the like is performed. The control content column 73d(4) includes an output processing column 73l and holds the command ID of the operation target and the content of the operation.

The control content column 73d(5) is an example of a case where control period setting processing, that is, a setting regarding a control period to be described later is performed. The control content column 73d(5) includes a control period setting column 73m and holds a control period and a start timing to be designated.

The control content column 73d(6) is an example of a case where cancel processing, that is, the execution of the specific control command 73 is canceled. The control content column 73d(6) includes a cancel processing column 73n and holds a command ID of a cancel target.

FIG. 4 is a table illustrating an example of information included in the transmission data 83.

The transmission data 83 includes a transmission source column 83a, a transmission date and time column 83b, a command ID column 83c, and a data column 83d.

The transmission source column 83a stores an IP address and a port number for specifying the I/O program 8 that has generated the transmission data 83.

The transmission date and time column 83b stores the date and time when the transmission data 83 is transmitted by the I/O program 8.

The command ID column 83c stores a command ID that specifies which control command 73 is instructed to transmit the transmission data 83.

The data column 83d holds content (for example, target, value) of data to be transmitted.

In the control system 100, the determination execution unit 70 (FIG. 2) of the control program 7 executed on the general-purpose OS 14 of the control node 1 generates the control command 73 based on state control set in advance for the device 4. In other words, the determination execution unit 70 considers what state or how to change the device 4 based on the information obtained from the sensor 40 or the like by processing involving complicated calculation or the like, and transmits the examination result to the I/O node 2 (the I/O program 8) as the control command 73. It is assumed that the control contents related to the device 4 are examined using a well-known technique, and a detailed description thereof is omitted here.

Actual processing such as operation of the device 4 is executed on the real-time OS 24 of the I/O node 2. The control command execution unit 80 of the I/O program 8 executes a control command on the real-time OS 24, thereby achieving both complicated processing and processing with high punctuality.

[Processing of Determination Execution Unit]

Hereinafter, processing contents of the determination execution unit 70 of the control program 7 will be described with reference to FIG. 5.

Figure 5:
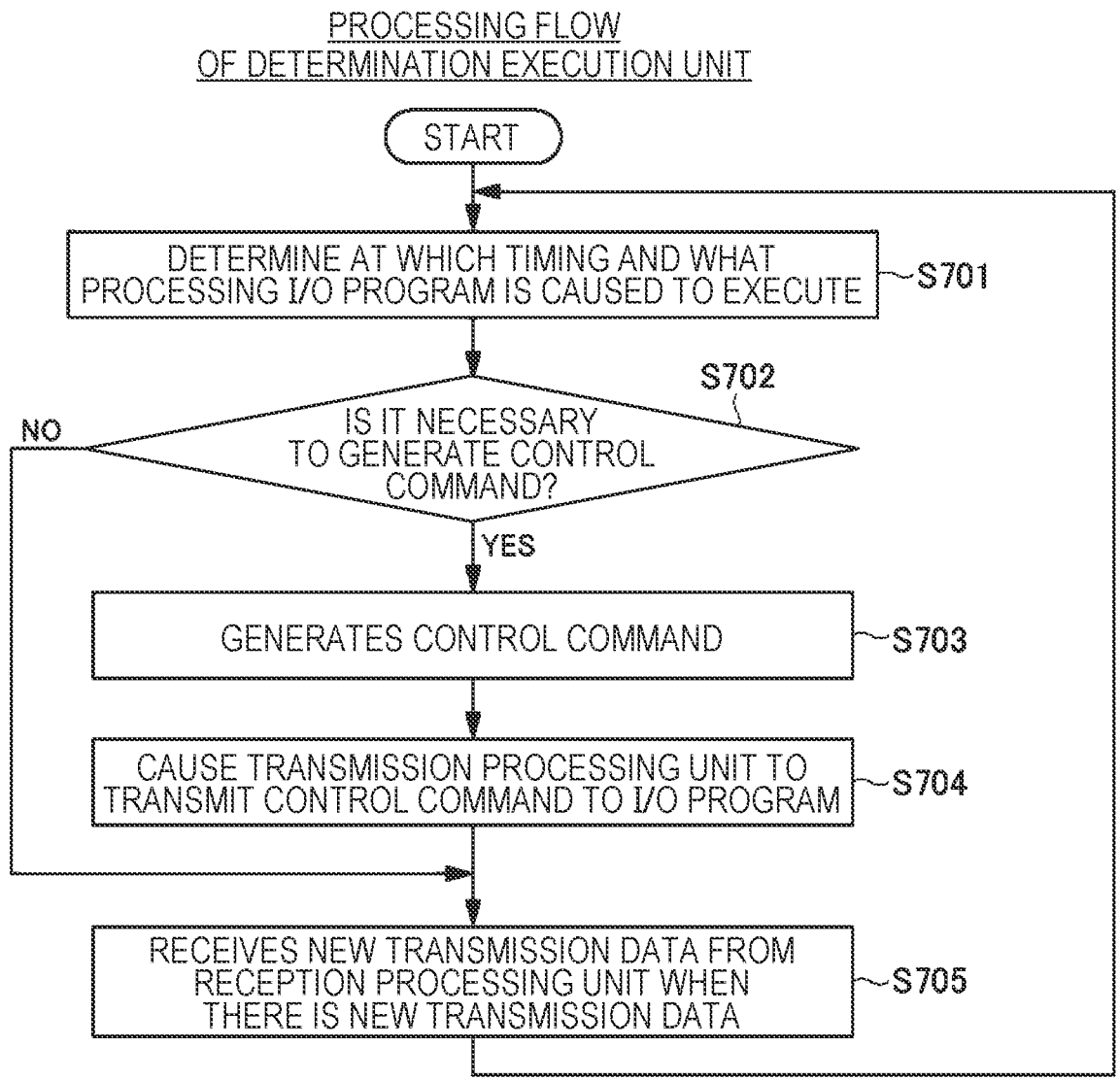
FIG. 5 is a flowchart illustrating a procedure example of processing by a determination execution unit.

FIG. 5 is a flowchart illustrating a procedure example of processing by the determination execution unit 70.

First, the determination execution unit 70 determines at which timing and what processing the I/O program 8 is caused to execute as the control system 100 (S701). Next, the determination execution unit 70 determines whether it is necessary to generate a control command (S702), and proceeds to Step S705 when it is not necessary to generate a control command (NO in S702). Next, when generation of the control command is necessary (YES in S702), the determination execution unit 70 generates the control command 73 (S703) and causes the transmission processing unit 72 to transmit the control command to the I/O program 8 (S704).

Next, the determination execution unit 70 receives new transmission data 83 from the reception processing unit 71 when there is the new transmission data (S705). The determination execution unit 70 confirms that the transmission data 83 received by the reception processing unit 71 is transmitted from the I/O program 8 controlled by the transmission source column 83*a* (FIG. 4), processes the transmission data 83, and uses the processed transmission data for determination in the next Step S701.

The control program 7 constantly executes the processing of Steps S701 to S705, and transmits the control command 73 to the I/O node 2 (I/O program 8) as needed.

When receiving the control command 73 transmitted by the determination execution unit 70 in Step S704, the reception processing unit 81 of the I/O program 8 passes the control command 73 to the command switching unit 84. The command switching unit 84 selects a control command 73 to be executed by a method to be described later, and passes the corresponding control command 73 to the control command execution unit 80.

[Control Command Reception Processing of Control Command Execution Unit]

Figure 6:
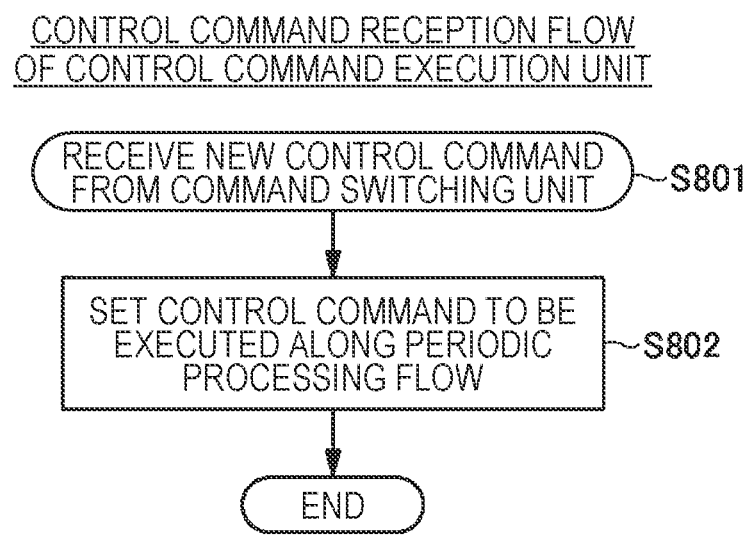
FIG. 6 is a flowchart illustrating a procedure example of control command reception processing of a control command execution unit.

FIG. 6 is a flowchart illustrating a procedure example of the control command reception processing of the control command execution unit 80.

When receiving the new control command 73 from the command switching unit 84 (S801), the control command execution unit 80 starts the control command reception flow. That is, the control command execution unit 80 sets the control command 73 to be executed along the periodic processing flow illustrated in FIG. 7 to be described later (S802). After Step S802 ends, the processing of this flowchart ends.

[Periodic Processing of Control Command Execution Unit]

Next, a procedure in which the control command execution unit 80 of the I/O program 8 executes the control command 73 will be described with reference to FIG. 7.

Figure 7:
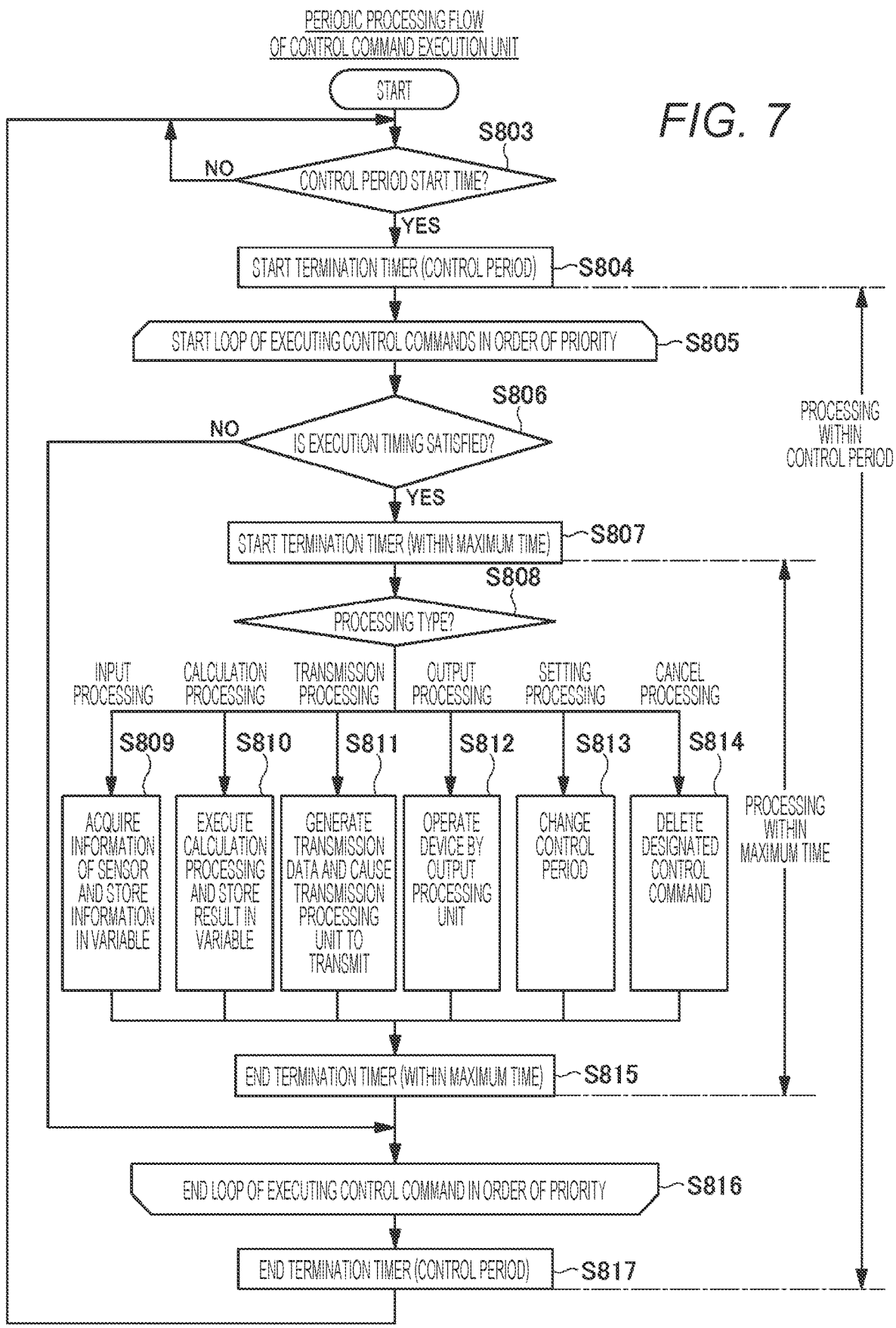
FIG. 7 is a flowchart illustrating a procedure example of periodic processing of the control command execution unit.

FIG. 7 is a flowchart illustrating a procedure example of the periodic processing of the control command execution unit 80.

The control command execution unit 80 executes a control command within a certain period of time. The period of this time is referred to as a "control period". The control period is set by the control command 73. First, the control command execution unit 80 determines whether the current time is the start time of the control period (S803), and when the current time is not the start time of the control period yet (NO in S803), monitoring of the start time of the control period is continued.

Next, when determining that it is time to start the control period (YES in S803), the control command execution unit 80 starts the operation of a termination timer for the control period (S804). The control command execution unit 80 determines the lapse of time corresponding to the control period from a measurement time of the termination timer. In a case where the processing based on the control command 73 is not completed even after the time corresponding to the designated control period has elapsed, the control command execution unit 80 terminates the execution of the control command 73 being executed during that time (stop).

Next, the control command execution unit 80 starts a loop of executing the control commands 73 in descending order of priority (S805). Next, the control command execution unit 80 determines whether the current state satisfies the condition of the execution timing of the control command 73 (S806), and in a case where the condition of the execution timing is not satisfied (NO in S806), the process proceeds to Step S816.

Next, the control command execution unit 80 starts the operation of the termination timer for the maximum time (S807). When the processing based on one control command 73 is not completed even after the specified maximum time is exceeded, the control command execution unit 80 terminates (stops) the execution of the control command 73 being executed at that time. The control command execution unit 80 does not start the termination timer when the maximum time column 73*h* is blank. Next, the control command execution unit 80 determines the processing type (control content) of the control command 73 (S808), and executes the processing of Steps S809 to S814 according to the processing type.

Step S809 is a step for input processing. The control command execution unit 80 acquires information of the sensor 40 and stores the acquired information in a variable of the memory 23 so that other steps can be used.

Step S810 is a step for calculation processing. The control command execution unit 80 executes the calculation processing and stores the result in a variable of the memory 23 so that other steps can be used. Step S811 is a step for transmission processing. The control command execution unit 80 generates the transmission data 83 including information to be transmitted, and causes the transmission processing unit 82 to transmit the transmission data to all the control programs 7 on the network 5.

Step S812 is a step for output processing. The control command execution unit 80 operates the actuator 41 of the control target device 4 via the output processing unit 86.

Step S813 is a step for setting processing. The control command execution unit 80 changes the control period.

Step S814 is a step for cancel processing. The control command execution unit 80 deletes the control command 73 designated by the command ID so as not to be executed.

Next, the control command execution unit 80 ends the termination timer for the maximum time (S815). During this time, execution of one control command 73 ends. After repeatedly executing the processing of Steps S806 to S815 for all the control commands 73, the control command execution unit 80 ends the loop of executing the control commands 73 in descending order of priority (S816).

Next, the control command execution unit 80 ends the termination timer for the control period (S817). Then, the control command execution unit 80 returns to Step S803 and repeatedly executes the processing of Steps S803 to S817.

Figure 8:
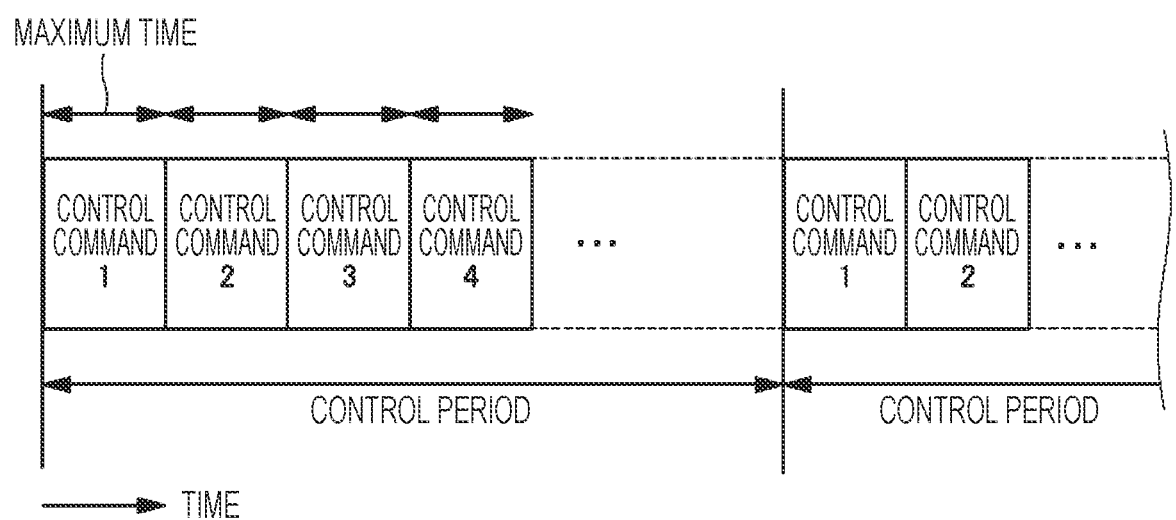
FIG. 8 is a table illustrating an example of an execution timing of a control command in the control command execution unit.

FIG. 8 illustrates an example of an execution timing of the control command 73 in the control command execution unit 80.

In FIG. 8, a state of execution of the control command 73 in the periodic processing flow (FIG. 7) of the control command execution unit 80 is represented by a time axis. With the termination timer for the maximum time, each control command 73 (control commands 1~4 . . . ) is not executed beyond the maximum time. Further, each control command 73 (control command 1~4 . . . ) is not continuously executed beyond the control period by the termination timer for the control period. Therefore, the control command execution unit 80 can execute the control command 73 with high punctuality.

Although the control command execution unit 80 constantly executes the periodic processing flow and sequentially executes all the control commands 73 in order of priority for each control period, the present invention is not limited to this as long as the control command 73 can be executed with high punctuality. When the condition of the execution timing of the control command 73 is satisfied by the function of the real-time OS 24, the control content of the control command 73 may be executed by interrupt processing. In addition, the control command 73 being executed may be interrupted by a context switch, and the control command 73 with higher priority may be executed. The context switch is a function of saving or restoring the state of the CPU. When the CPU 20 of the I/O node 2 has a plurality of cores, the control command processing may be executed in parallel.

In addition, the IP address and the port number are used as the information for specifying the control program 7 and the I/O program 8. However, the IP address and the port number are used by the protocol on the network 5, and the information is not limited thereto as long as the information can uniquely specify the program on the network 5. The same applies to the following description.

[Procedure for Changing Control Program]

Referring again to FIG. 2, a procedure for changing the control program 7 in the control system 100 according to the present embodiment will be described.

In order to change the control program of the control node 1, the administrator 36 of the control system 100 operates the control program 7A-1 after the change on the control node 1 while operating the control program 7 before the change. Then, the control command execution unit 80 of the I/O program 8 switches to process the control command 73A-1 generated by the determination execution unit 70A-1 of the control program 7A-1, and stops the control program 7 before change.

Since the control command execution unit 80 continues the processing of the received control command 73 stored in the storage device 21 even while switching the control program, the control program can be changed without stopping the control system 100.

Similarly to the control program 7 before the change, the determination execution unit 70A-1 of the control program 7A-1 after the change generates the control command 73A-1 according to the determination, and transmits the control command from the transmission processing unit 72A-1 to the I/O program 8. The reception processing unit 81 of the I/O program 8 receives the control command 73 and the control command 73A-1, and passes the commands to the command switching unit 84.

[Control Command Processing of Command Switching Unit]

Next, a procedure of control command processing by the command switching unit 84 of the I/O program 8 will be described with reference to FIG. 9.

Figure 9:
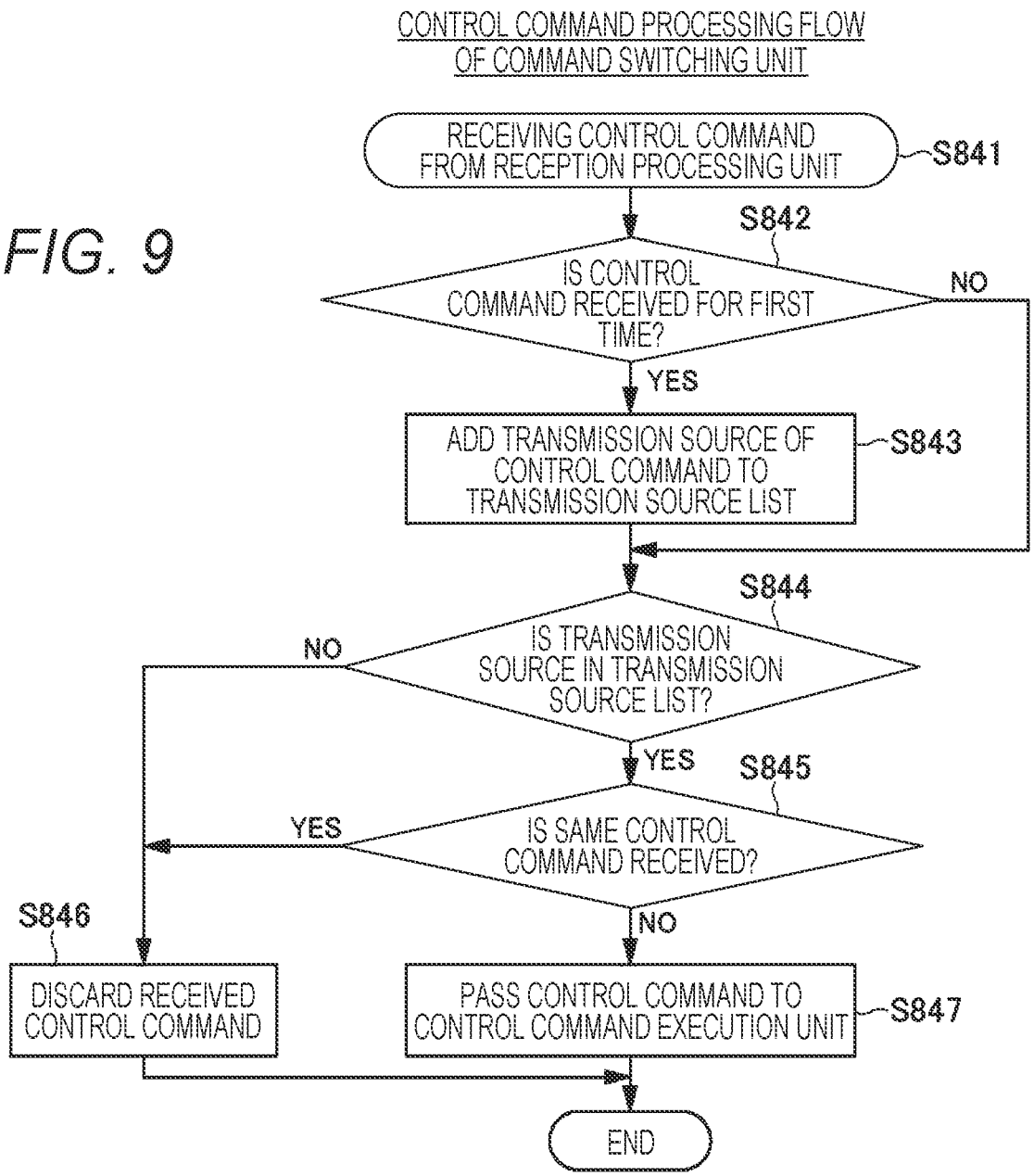
FIG. 9 is a flowchart illustrating a procedure example of control command processing of a command switching unit.

FIG. 9 is a flowchart illustrating a procedure example of control command processing of the command switching unit 84.

When receiving the control command 73 from the reception processing unit 81 (S841), the command switching unit 84 starts the control command processing flow illustrated in FIG. 9. First, the command switching unit 84 determines whether the control command 73 is received for the first time (S842), and if the control command 73 is not received for the first time (NO in S842), the process proceeds to Step S844.

Next, in a case where it is the first time that the control command 73 is received (YES in S842), the command switching unit 84 proceeds to Step S843. For example, the command switching unit 84 adds the IP address and the port number recorded in the transmission source column 73a of the control command 73 received at the time of the first activation of the control system 100 to the transmission source list 87 (S843).

Next, after the processing in Step S843 or in the case of NO determination in Step S842, the command switching unit 84 determines whether the transmission source (IP address and port number) described in the transmission source column 73a of the received control command 73 is included in the transmission source list 87 (S844). Then, the command switching unit 84 proceeds to Step S846 in a case where the transmission source of the control command 73 is not included in the transmission source list 87 (NO in S844), and proceeds to Step S845 in a case where the transmission source is included in the transmission source list 87 (YES in S844).

Next, the command switching unit 84 checks the received control commands 73 in the command storage area 211 in order of generation date and time, and determines whether the control command 73 having the same control content has already been received (S845). When the control command 73 having the same contents has been received (YES in S845), the command switching unit 84 proceeds to Step S846. When NO in Step S844 or YES in Step S845, the command switching unit 84 discards the received control command 73 (S846).

Meanwhile, when the control command 73 having the same content is not received (NO in S845), the command switching unit 84 passes the control command 73 to the control command execution unit 80 (S847). That is, by switching by the command switching unit 84, the control command execution unit 80 executes only the control command from the control program 7 that is the transmission source of the control command 73 received first. After the processing of Step S846 or S847, the processing of the flowchart illustrated in FIG. 9 ends.

[Switching Signal Processing of Command Switching Unit]

Figure 10:
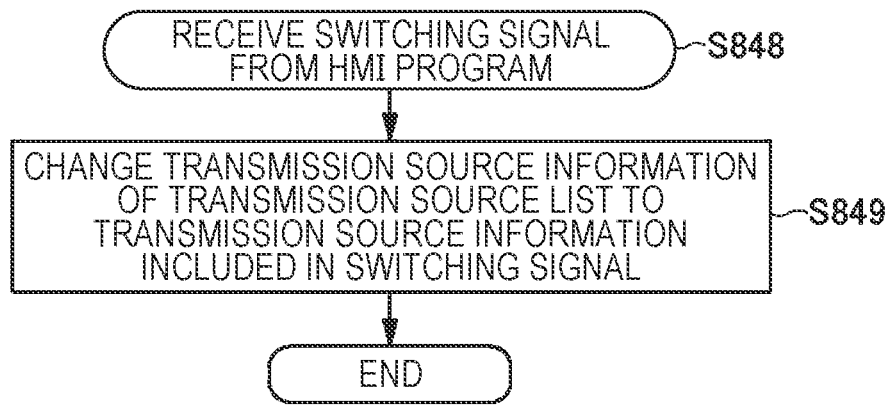
FIG. 10 is a flowchart illustrating a procedure example of switching signal processing of the command switching unit.

FIG. 10 is a flowchart illustrating a procedure example of switching signal processing of the command switching unit 84.

The administrator 36 of the control system 100 illustrated in FIG. 2 operates the switching signal transmission screen 90 in order to process the control command 73A-1 generated by the control program 7A-1. The HMI program 9 transmits the switching signal to the command switching unit 84 based on the operation content on the switching signal transmission screen 90. When receiving the switching signal from the HMI program 9 (S848), the command switching unit 84 starts the switching signal processing flow illustrated in FIG. 10. That is, the command switching unit 84 changes the transmission source information of the transmission source list 87 to the transmission source information included in the switching signal (S849). After the processing of Step S849, the processing of the flowchart illustrated in FIG. 10 ends.

Figure 11:
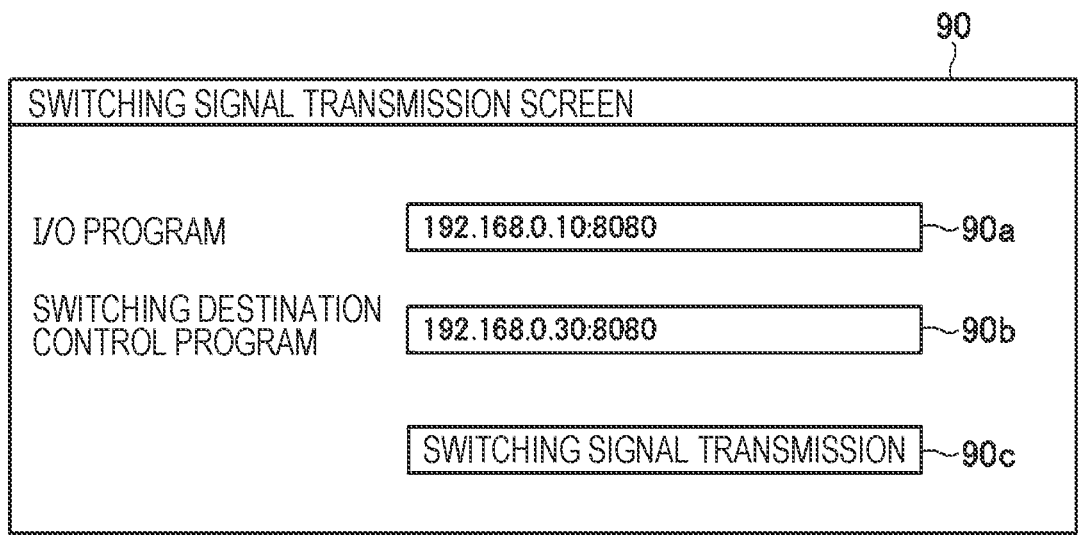
FIG. 11 is a table illustrating an example of a switching signal transmission screen.

FIG. 11 illustrates an example of a switching signal transmission screen 90 of the HMI program 9.

The switching signal transmission screen 90 includes an area 90a for inputting the IP address and the port number of the I/O program 8, an area 90b for inputting the IP address and the port number of the control program 7A-1 of the switching destination (after the change), and a button 90c for instructing transmission of the switching signal. After connecting the changed control program 7A-1 to the network 5 and activating the program, the administrator 36 of the control system 100 transmits the switching signal using the switching signal transmission screen 90, and sets the command switching unit 84 to process the control command 73A-1.

Here, the transmission processing unit 82 of the I/O program 8 transmits the transmission data 83 to all the control programs on the network 5. Therefore, the control program 7 before the change and the control program 7A-1 after the change receive the same transmission data 83, and the control program 7 and the control program 7A-1 grasp the state of the device 4.

In the above example, the HMI program 9 includes the switching signal transmission screen 90, but a similar user interface may be provided in the control node 1 and the I/O node 2, and the control program 7 and the I/O program 8 may include the switching signal transmission screen 90. It is sufficient that the administrator 36 of the control system 100 can notify the command switching unit 84 of information specifying the control program 7A-1 which a switching destination, and the operation is not limited to the operation via the user interface. For example, this can also be realized by connecting a storage device storing information for specifying the switching destination to the I/O node 2 and reading this information by the command switching unit 84.

In Steps S842 and S843, the command switching unit 84 adds the transmission source information of the control command 73 at the time of initial receipt to the transmission source list 87, but the present invention is not limited to this example. For example, the same step may be eliminated, and the administrator 36 of the control system 100 may designate via the HMI program 9 before the start of the control program 7.

The changed control program 7A-1 is executed on the control node 1, but may be executed on another control node as long as the control program is connected to the network 5.

Further, for the sake of explanation, only one I/O node 2 is present in the network 5, but a plurality of I/O nodes may actually be present. In addition, one control program may transmit a control command to a plurality of I/O programs.

According to the first embodiment described above, it is possible to change the resource used in the control system (the control node in the above example) without stopping the control system while maintaining punctuality. Here, the resource is a program or a node (computer).

A computer used in a control system is prepared by estimating required performance from the contents of the control, but it is difficult to accurately estimate the required performance. Therefore, the performance may be insufficient after the operation of the control system. In addition, performance may be insufficient when a new function is added to the control system. According to the present embodiment configured as described above, it is possible to construct a highly scalable control system capable of adding necessary resources each time.

As described above, the control system (control system 100) according to the first embodiment includes at least one control node (control node 1) and at least one I/O node (I/O node 2) that is connected to one or more control target devices (devices 4) and can communicate with the control node via a network.

The control node includes a first operating system (general-purpose OS 14) and a first processor (CPU 10) that executes at least one control program (for example, control programs 7 and 7A-1) on the first operating system.

The I/O node includes a second operating system (real-time OS 24) having higher punctuality than the first operating system, and a second processor (CPU 20) that executes at least one I/O program (for example, I/O program 8) on the second operating system.

The control program for the control node includes a determination execution unit (determination execution unit 70, 73A-1) that generates a control command (control command 73, 70A-1) based on state control set in advance for the control target device and transmits the control command to the I/O node.

The I/O program of the I/O node includes a control command execution unit (control command execution unit 80) that stores the control command received from the control node in a storage unit (storage device 21: command storage area 211) and executes processing related to the control target device according to the control command stored in the storage unit.

In the control system (control system 100) according to the first embodiment, when a plurality of control commands are stored in the storage unit (storage device 21), the control command execution unit (control command execution unit 80) is configured to execute processing (input processing, calculation processing, transmission processing, output processing, setting processing, cancel processing, and the like) prescribed in the control commands in descending order of priority along the control period among the plurality of control commands, and when the processing of the control command is not completed within the control period, the processing of the control command is stopped at a point in time when the control period is exceeded.

In the control system (control system 100) according to the first embodiment, the I/O program (I/O program 8) includes a command switching unit (command switching unit 84) that selects a control command to be executed from the plurality of control commands received from the plurality of control programs. The command switching unit is configured to select a control command generated by the control program after switching among the plurality of control programs and transmit the control command to the control command execution unit (control command execution unit 80).

2. Second Embodiment

In a second embodiment, a method of making a control system redundant by using a plurality of control nodes and automatically recovering to a redundant configuration after replacing a failed control node will be described.

[Logical Configuration of Configuration Management Program]

Figure 12:
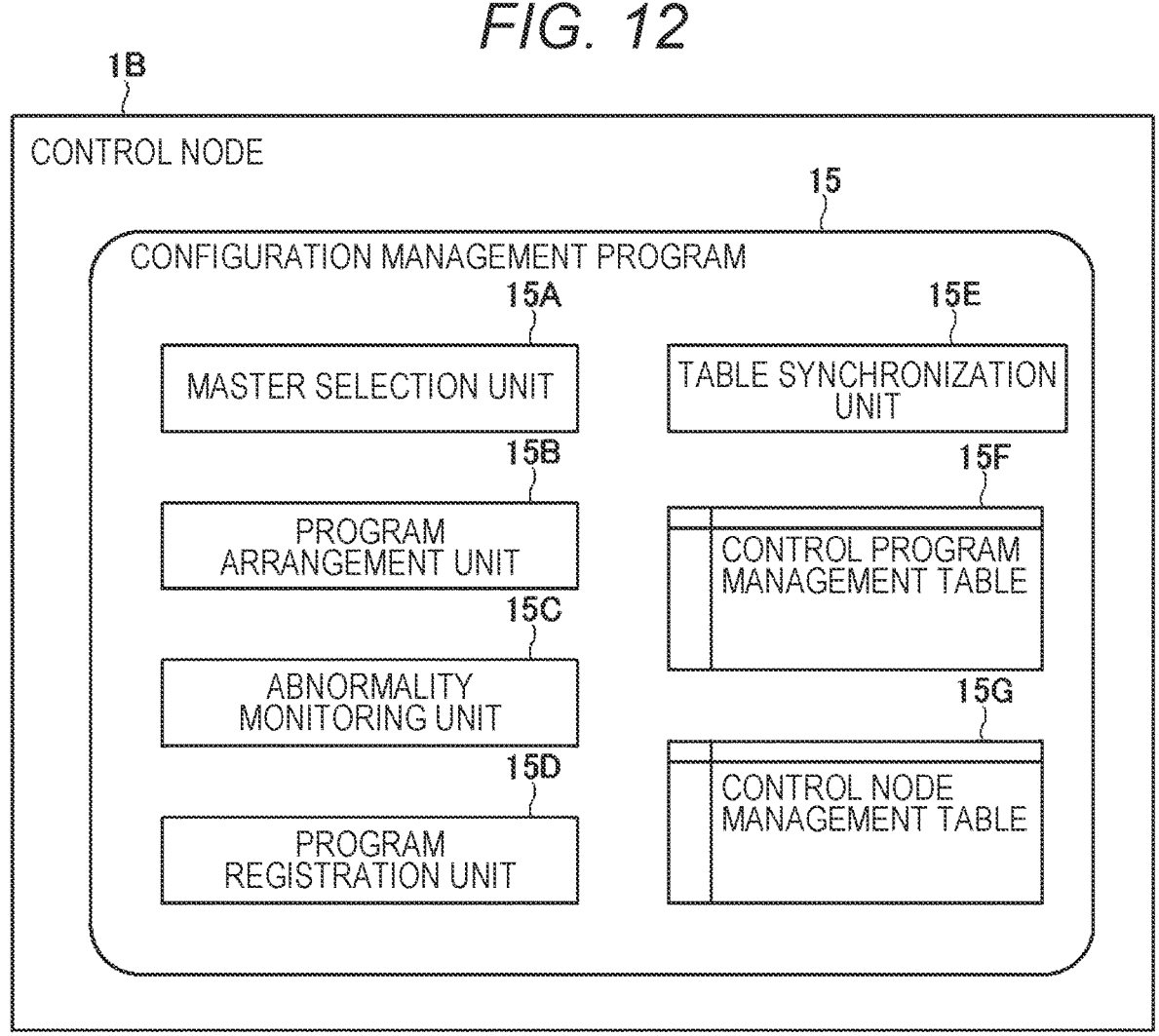
FIG. 12 is a block diagram illustrating an example of a logical configuration of a configuration management program introduced into a control node according to a second embodiment of the present invention.

FIG. 12 is a block diagram illustrating an example of a logical configuration of a configuration management program 15 introduced into a control node 1B according to a second embodiment.

The control node 1B has a configuration in which the configuration management program 15 is added to the control node 1 described in the first embodiment. Similarly to the control program 7, the configuration management program 15 is also executed by a CPU 10 on a general-purpose OS 14. The configuration management program 15 includes a master selection unit 15A, a program arrangement unit 15B, an abnormality monitoring unit 15C, a program registration unit 15D, a table synchronization unit 15E (an example of an information synchronization unit), a control program management table 15F, and a control node management table 15G.

The configuration management program 15 takes either a master state or a slave state. Only one master-state configuration management program 15 exists on one network 5, and plays a role of distributing corresponding data to the slave-state configuration management program 15 in order to share data necessary for control. An instruction from the administrator 36 of the control system 100B is received through the HMI program 9.

[Overall Configuration of Control System]

Figure 13:
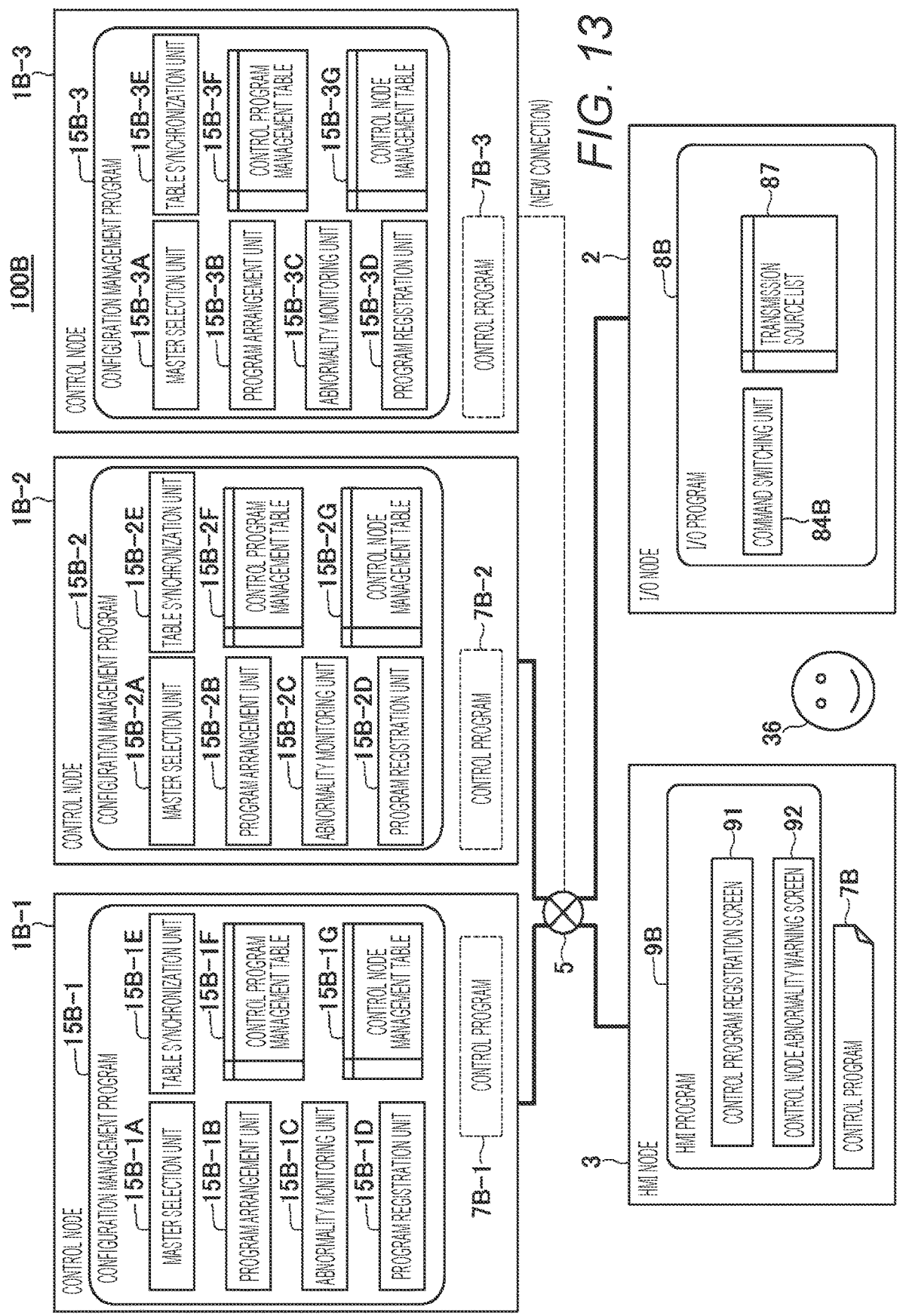
FIG. 13 is a block diagram illustrating an example of an overall configuration of a control system according to a second embodiment of the present invention.

FIG. 13 is a block diagram illustrating an example of an overall configuration of a control system 100B according to the second embodiment.

In the control system 100B, two control nodes 1B are used as control nodes 1B-1 and 1B-2. Similarly to the first embodiment, each of the control nodes 1B-1 and 1B-2 is connected to an I/O node 2 and an HMI node 3 via the network 5.

The control node 1B-1 includes a configuration management program 15B-1 and a control program 7B-1. The configuration management program 15B-1 includes a master selection unit 15B-1A, a program arrangement unit 15B-1B, an abnormality monitoring unit 15B-1C, a program registration unit 15B-1D, a table synchronization unit 15B-1E (an example of an information synchronization unit), a control program management table 15B-1F, and a control node management table 15B-1G.

Similarly, the control node 1B-2 includes a configuration management program 15B-2 and a control program 7B-2. The configuration management program 15B-2 includes a master selection unit 15B-2A, a program arrangement unit 15B-2B, an abnormality monitoring unit 15B-2C, a program registration unit 15B-2D, a table synchronization unit 15B-2E (an example of an information synchronization unit), a control program management table 15B-2F, and a control node management table 15B-2G.

A control node 1B-3 is an example of a control node newly connected to recover the redundant configuration of the control system 100B. The control node 1B-3 also has the same configuration as the control nodes 1B-1 and 1B-2. That is, the control node 1B-3 includes a configuration management program 15B-3 and a control program 7B-3. The configuration management program 15B-3 includes a master selection unit 15B-3A, a program arrangement unit 15B-3B, an abnormality monitoring unit 15B-3C, a program registration unit 15B-3D, a table synchronization unit 15B-3E (an example of an information synchronization unit), a control program management table 15B-3F, and a control node management table 15B-3G. The recovery of the redundant configuration using the control node 1B-3 will be described later. When the control nodes 1B-1, 1B-2, and 1B-3 are not distinguished from each other, they are referred to as "control nodes 1B".

The I/O node 2 executes an I/O program 8B in which the command switching unit 84 is changed to a command switching unit 84B. The HMI node 3 executes an HMI program 9B in which a new screen is added to the HMI program 9 and a control program 7B. The HMI program 9B has a control program registration screen 91 and a control node abnormality warning screen 92 which are operation screens by the GUI.

[Control Program Management Table, Control Node Management Table]

FIGS. 14 and 15 illustrate specific examples of each table of the configuration management program 15. FIG. 14 illustrates an example of a structure of the control program management table 15F used by the configuration management program 15.

FIG. 15 illustrates an example of a structure of the control node management table 15G used by the configuration management program 15.

The control program management table 15F includes a program ID column 15f-1, a saving destination column 15f-2, a type column 15f-3, and a configuration number column 15f-4.

The program ID column 15f-1 stores a control program ID for uniquely specifying the control program.

The saving destination column 15f-2 stores information indicating a saving destination location of the control program.

The type column 15f-3 stores information indicating an execution method of the control system 100B.

The configuration number column 15f-4 stores the number of control nodes used when the control program specified by the control program ID is executed.

The control node management table 15G includes a control node ID column 15g-1, a master/slave column 15g-2, an execution control program ID column 15g-3, and an executability column 15g-4.

The control node ID column 15g-1 stores a control node ID for uniquely specifying a control node.

The master/slave column 15g-2 stores information indicating whether the state of the configuration management program (control node) is master or slave. There is only one control node in the master state in one network. Note that the master/slave information may be managed by other than the control node management table 15G.

The execution control program ID column 15g-3 stores a control program ID for uniquely specifying the control program being executed.

The executability column 15g-4 stores information indicating whether the control program can be executed on the control node.

The control node IDs stored in the control node ID column 15g-1 are assigned to the control nodes from 1 in the order of their activation. At the time of starting the execution of the configuration management program 15, each table does not have even one record.

[Start Processing of Master Selection Unit]

Figure 16:
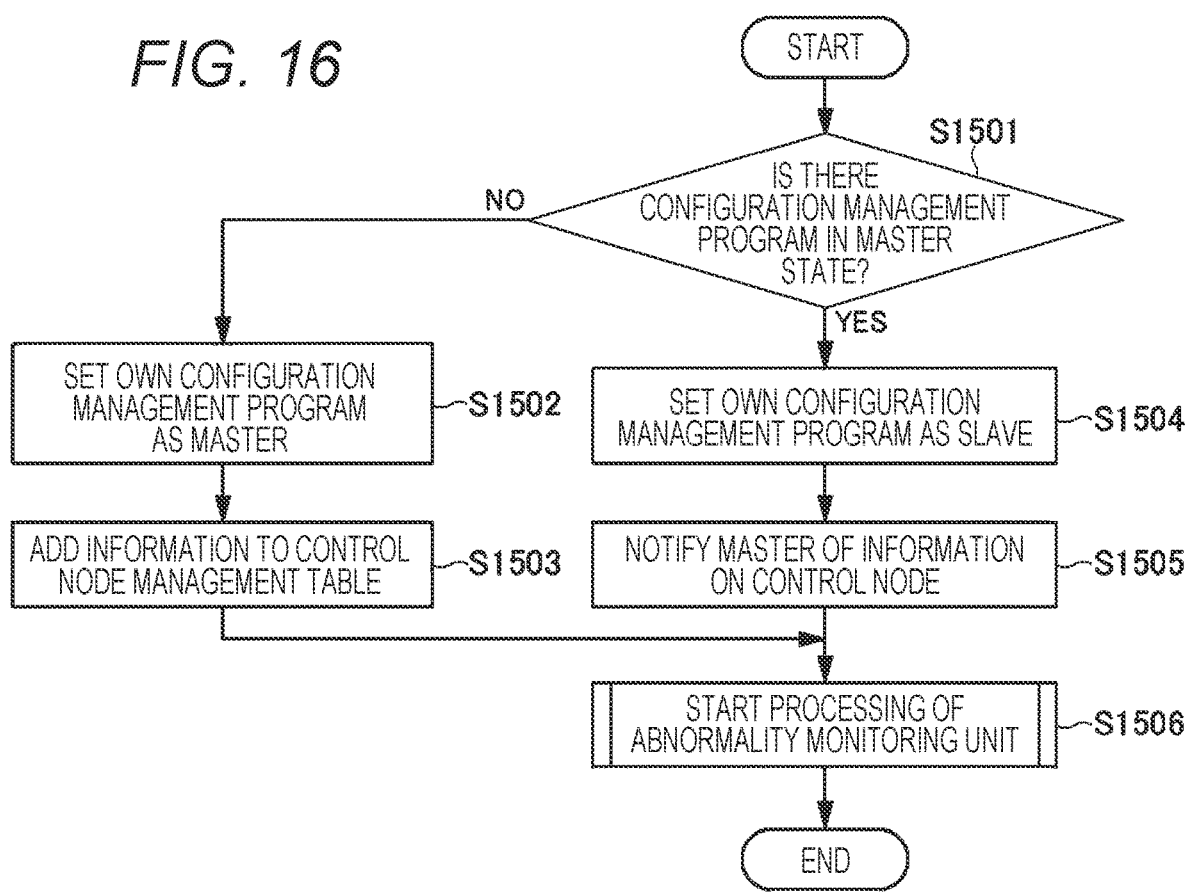
FIG. 16 is a flowchart illustrating a procedure example of start processing of a master selection unit.

FIG. 16 is a flowchart illustrating a procedure example of start processing of the master selection unit 15A.

The administrator 36 of the control system 100B starts operation of the control nodes 1B-1 and 1B-2 through a user interface 35. Accordingly, the configuration management program 15B-1 starts the start flow of the master selection unit 15B-1A illustrated in FIG. 16.

First, the master selection unit 15B-1A of the control node 1B-1 determines whether there is a configuration management program (control node) in the master state on the network 5 (S1501). The master selection unit 15B-1A proceeds to Step S1502 when the configuration management program 15 in the master state does not exist (NO in S1501), and proceeds to Step S1504 when the configuration management program 15 in the master state exists (YES in S1501).

It is assumed that the configuration management program 15B-1 is started first. In this case, the master selection unit 15B-1A determines in Step S1501 that the configuration management program 15 in the master state does not exist on the network 5 (NO in S1501), and sets the configuration management program 15B-1 as the master (S1502). Then, the master selection unit 15B-1A adds information on its own control node 1B-1 to the control node management table 15B-1G by the table synchronization unit 15B-1E (S1503). After the processing of Step S1503, the process proceeds to Step S1506.

Since the configuration management program 15B-1 is already in the master state at the time of activation, the master selection unit 15B-2A of the control node 1B-2 sets its own configuration management program 15B-2 as a slave (S1504). Then, the master selection unit 15B-2A notifies the master selection unit 15B-1A of the control node 1B-1 of the information on the control node 1B-2 (S1505).

Then, after completion of Step S1503 or S1505, the master selection unit 15A of each of the configuration management programs 15B-1 and 15B-2 causes the abnormality monitoring unit 15C to start processing (S1506). The processing of the abnormality monitoring unit 15C in Step S1506 will be described later with reference to FIG. 25. After the processing of Step S1506, the processing of this flowchart ends.

[Control Node Management Processing of Master Selection Unit]

Figure 17:
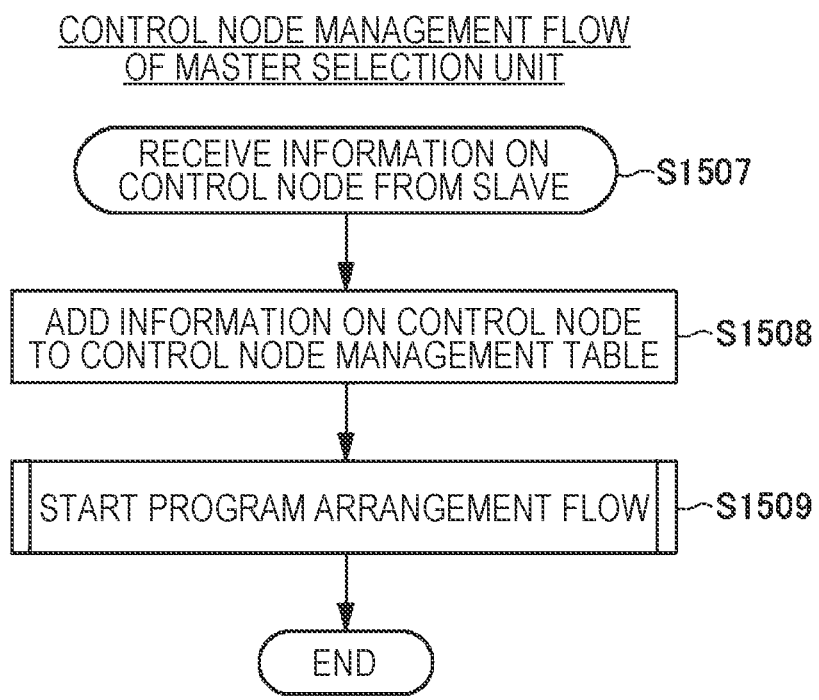
FIG. 17 is a flowchart illustrating a procedure example of control node management processing of the master selection unit.

FIG. 17 is a flowchart illustrating a procedure example of control node management processing of the master selection unit 15A.

Upon receiving the information on the control node from the control node 1B-2 in the slave state (S1507), the master selection unit 15B-1A of the control node 1B-1 in the master state starts the control node management flow.

First, the master selection unit 15B-1A additionally registers the received information on the control node 1B-2 in the control node management table 15B-1G by the table synchronization unit 15B-1E (S1508).

Figure 21:
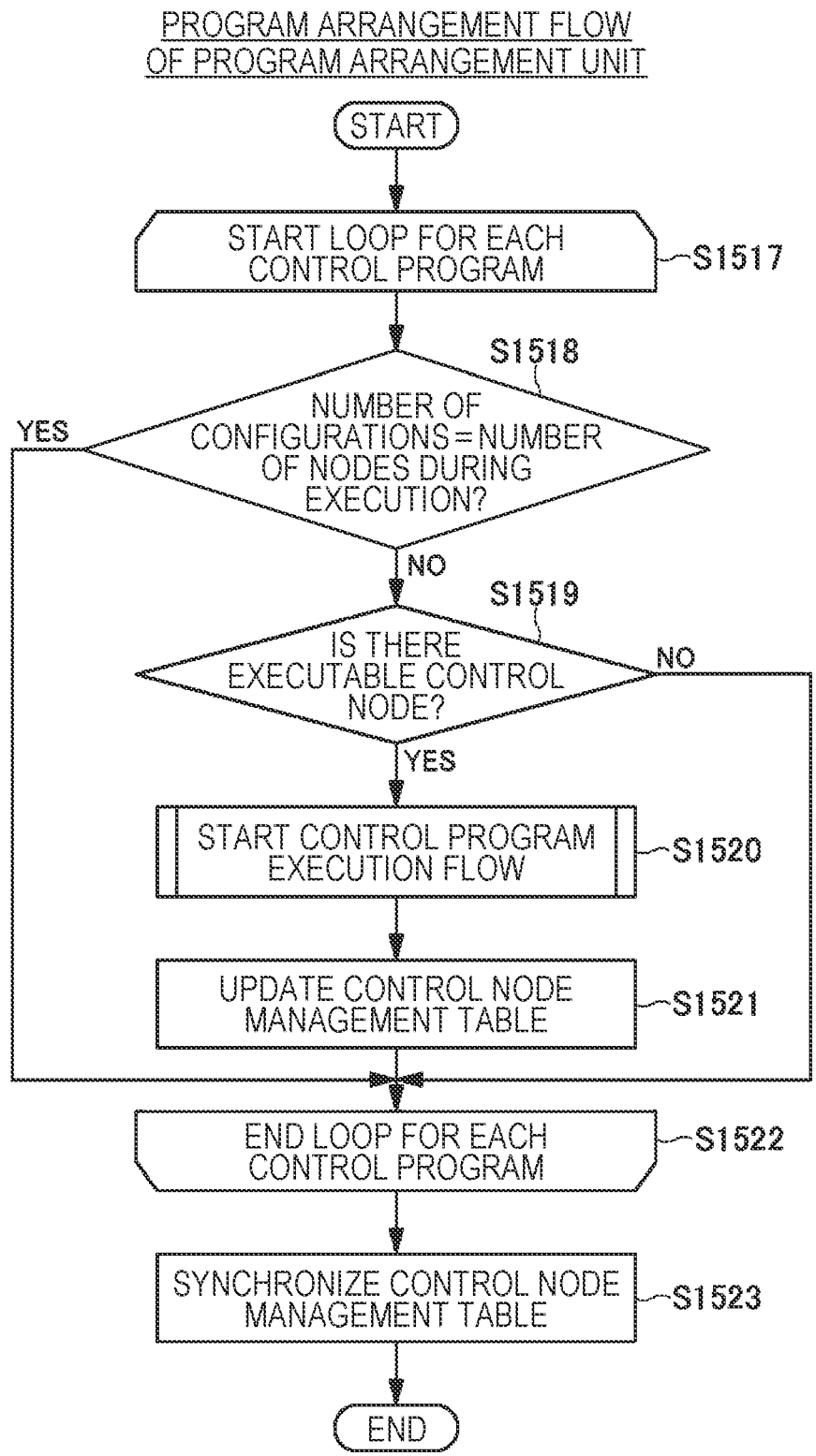
FIG. 21 is a flowchart illustrating a procedure example of program arrangement processing of a program arrangement unit.

Next, the master selection unit 15B-1A causes the program arrangement unit 15B-1B to start the program arrangement flow illustrated in FIG. 21 (S1509). At this time, since the control program is not registered in a control program management table 15B-1F, the control program is not arranged. After the processing of Step S1509, the processing of this flowchart ends.

[Synchronization Processing of Table Synchronization Unit]

Figure 18:
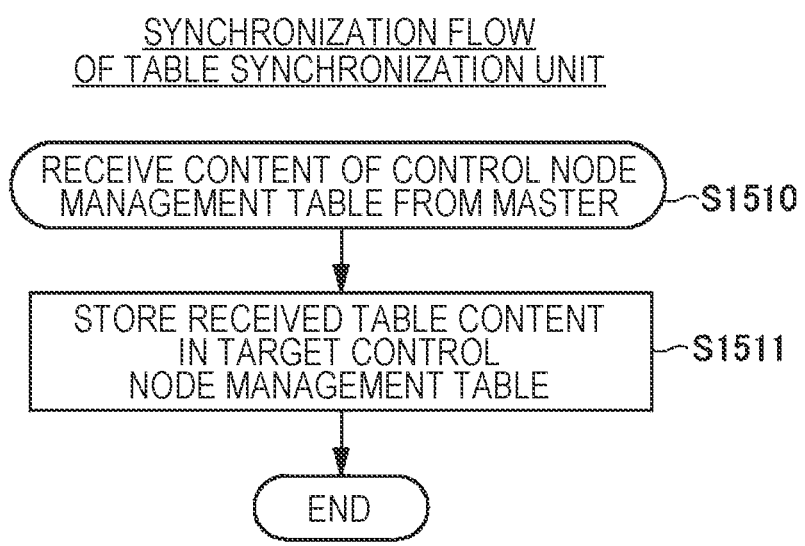
FIG. 18 is a flowchart illustrating a procedure example of synchronization processing of a table synchronization unit.

FIG. 18 is a flowchart illustrating a procedure example of synchronization processing of the table synchronization unit 15E. In Step S1523 of FIG. 21 described later, the contents of the control node management table 15B-1G are notified from the configuration management program 15B-1 in the master state to the table synchronization unit 15B-2E of the configuration management program 15B-2 in the slave state. Upon receiving the contents of the control node management table 15B-1G (S1510), the table synchronization unit 15B-2E starts the synchronization flow illustrated in FIG. 18. That is, the table synchronization unit 15B-2E stores the content of the received control node management table 15B-1G in the control node management table 15B-2G (S1511). After the processing of Step S1511, the processing of this flowchart ends.

The table synchronization unit 15B-2E registers all the received information in the control node management table 15B-2G. As a result, when there is a plurality of the configuration management programs 15 in the slave state, the contents of the control node management tables 15B-1G on the configuration management program 15B-1 in the master state are the same as the contents of all the control node management tables 15G in the slave state. In either the master state or the slave state, the configuration management program 15 starts execution of an abnormality monitoring unit 15C described later in Step S1504.

Figure 19:
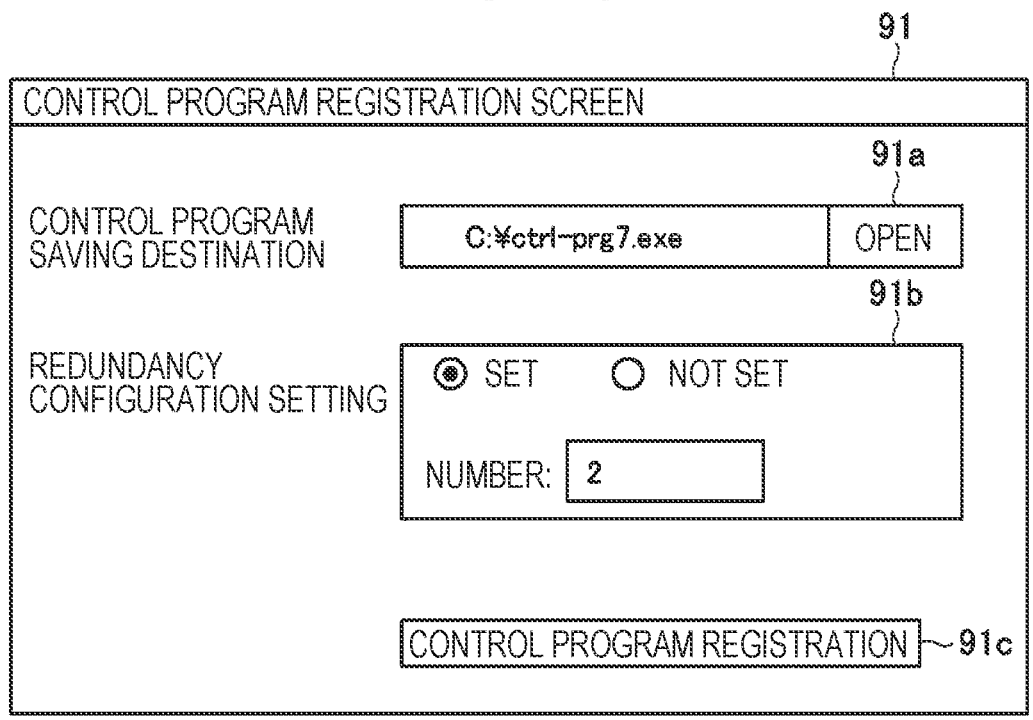
FIG. 19 is a table illustrating an example of a control program registration screen.

FIG. 19 illustrates an example of the control program registration screen 91.

The administrator 36 of the control system 100B performs an operation to arrange the execution file of the control program 7B in the storage device 31 of the HMI node 3 so as to start the execution of the control program 7B in the redundant configuration. On the control program registration screen 91 illustrated in FIG. 19 of the HMI program 9B, the administrator 36 inputs the saving location of the execution file of the control program 7B to the control program saving destination column 91a. Further, the administrator 36 inputs necessity of implementation of redundancy and the number of control nodes in a case of redundancy to a redundancy configuration setting column 91b, and presses a control program registration button 91c.

[Program Registration Processing of Program Registration Unit]

Figure 20:
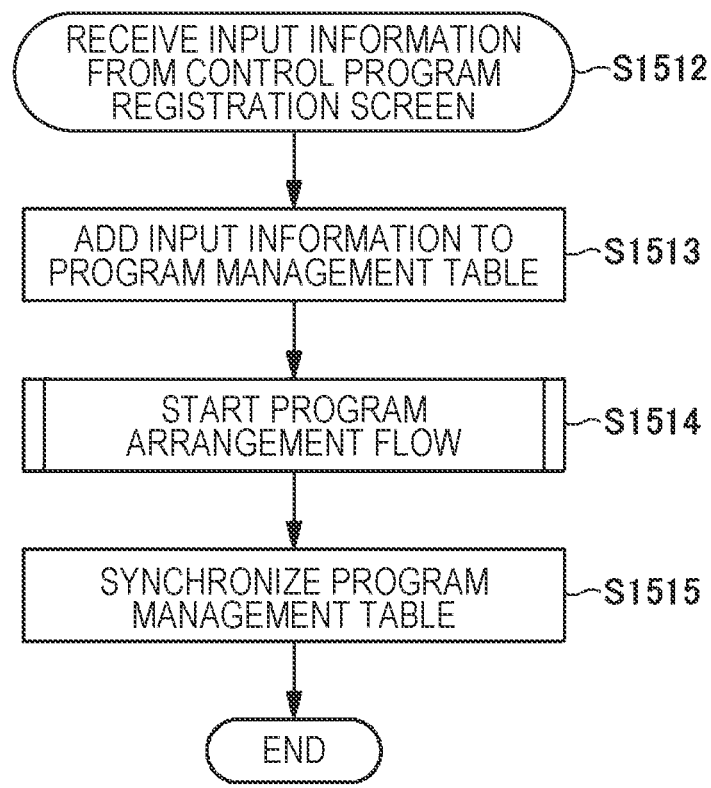
FIG. 20 is a flowchart illustrating a procedure example of program registration processing of a program registration unit.

FIG. 20 is a flowchart illustrating a procedure example of program registration processing of the program registration unit 15D. This processing is processing for starting the control program.

The control program registration screen 91 notifies the program registration unit 15B-1D in the configuration management program 15B-1 in the master state of the input information. When receiving the input information (S1512), the program registration unit 15B-1D adds the input information to the control program management table 15B-1F (S1513), and causes the program arrangement unit 15B-1B to start the program arrangement flow (S1514).

Next, the program registration unit 15B-1D transmits the content of the control program management table 15B-1F to the table synchronization unit 15B-2E of the configuration management program 15B-2 for synchronization (S1515). As a result, when there is a plurality of the configuration management programs 15 in the slave state, the content of the control program management table 15B-1F in the master state matches the content of the control program management table 15F of all the configuration management programs 15 in the slave state.

[Program Arrangement Processing of Program Arrangement Unit]

FIG. 21 is a flowchart illustrating a procedure example of the program arrangement processing of the program arrangement unit 15B.

The program arrangement unit 15B-1B in the configuration management program 15B-1 in the master state starts the program arrangement flow illustrated in FIG. 21 in response to an instruction from the program registration unit 15B-1D or the like (S1517). The program arrangement flow is looped for each control program registered in the control program management table 15B-1F.

The program arrangement unit 15B-1B compares the number of configurations described in the control program management table 15B-1F with the content of the control node management table 15B-1G (S1518). In a case where the number of control nodes executing each control program and the above-described number of components match (YES in S1518), the program arrangement unit 15B-1B proceeds to Step S1522 and ends the loop.

Meanwhile, when the number of control nodes executing each control program is smaller than the above configuration number (NO in S1518), the program arrangement unit 15B-1B refers to the control node management table 15B-1G and determines whether there is a control node capable of executing the control program (S1519). When there is no control node capable of executing the control program (NO in S1519), the program arrangement unit 15B-1B proceeds to Step S1522.

Next, in a case where there is a control node capable of executing the control program (YES in S1519), the program arrangement unit 15B-1B notifies the program arrangement unit 15B of the corresponding control node to start the program execution flow (S1520). For example, in a case where the control node 1B-1 and the control node 1B-2 can execute the control program, the program arrangement unit 15B-1B starts the program execution flow by the program arrangement unit 15B-1B itself and causes the program arrangement unit 15B-2B to start the program execution flow.

Next, the program arrangement unit 15B-1B updates the execution control program ID column 15g-3 of the control node management table 15B-1G (S1521). When the processing is completed for all the control programs in the control program management table 15B-1F, the loop processing ends (S1522).

Next, the program arrangement unit 15B-1B notifies the table synchronization unit 15E of another configuration management program 15 of the information of the control node management table 15B-1G. As a result, the information on the control node management table 15B-1G is synchronized with the information of all the other control node management tables 15G (S1523).

[Program Execution Processing of Program Arrangement Unit]

Figure 22:
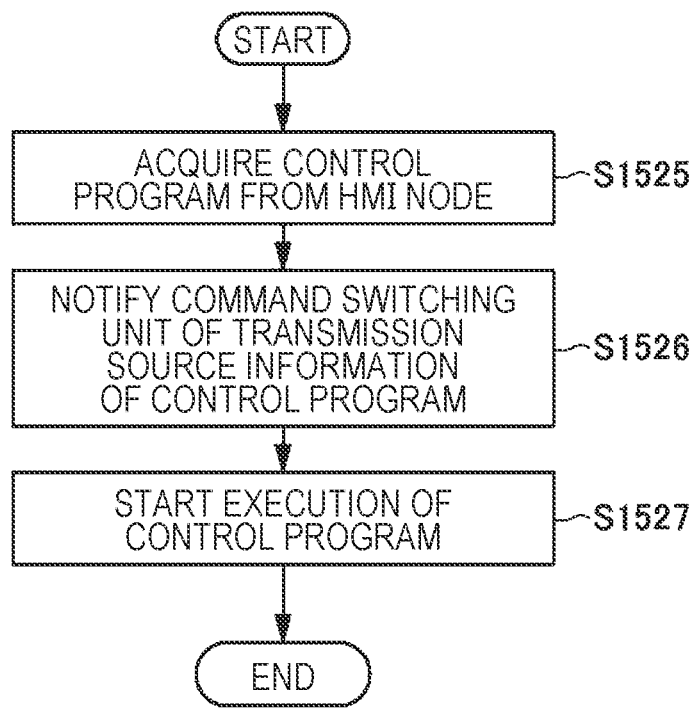
FIG. 22 is a flowchart illustrating a procedure example of program execution processing of a program arrangement unit.

FIG. 22 is a flowchart illustrating a procedure example of program execution processing of the program arrangement unit 15B.

In the program execution flow illustrated in FIG. 22, the program arrangement unit 15B-1B acquires the execution file of the target control program 7B-1 from the HMI node 3, and enters a state where the execution file can be executed as the control program 7B-1 (S1525). Next, the program arrangement unit 15B-1B notifies the command switching unit 84B in the I/O program 8B of the I/O node 2 of the IP address and the port number of the control program 7B-1 (S1526), and starts execution of the control program 7B-1 (S1527). The program arrangement unit 15B-2B operates in the same manner. After Step S1527 ends, the processing of this flowchart ends.

[Configuration Notification Processing of Command Switching Unit]

Figure 23:
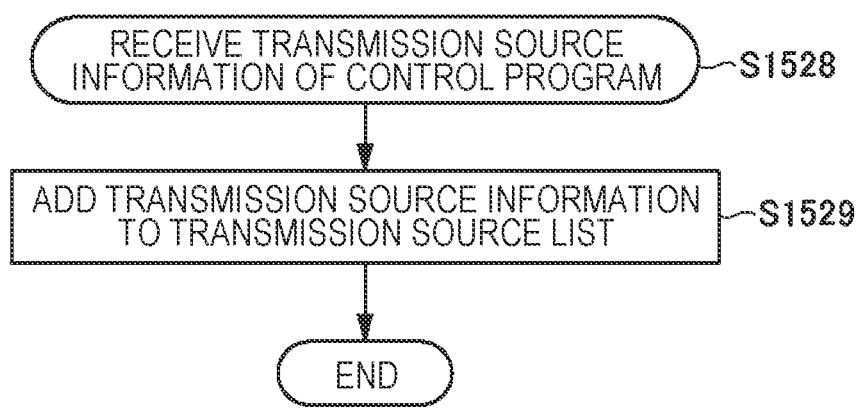
FIG. 23 is a flowchart illustrating a procedure example of configuration notification processing of a command switching unit.

FIG. 23 is a flowchart illustrating a procedure example of the configuration notification processing of the command switching unit 84.

When receiving the transmission source information of the control program 7B-1 from the configuration management program 15B-1 (S1528), the command switching unit 84B of the I/O program 8B starts the configuration notification flow. That is, the command switching unit 84B adds the received transmission source information to the transmission source list 87 (S1529). As a result, the control command 73 output from both the control programs 7B-1 and 7B-2 can be processed. After the processing of Step S1529, the processing of this flowchart ends.

Next, how redundancy is realized by the control nodes 1B-1 and 1B-2 (FIG. 13) executing the same control program 7B will be described with reference to FIG. 24.

Figure 24:
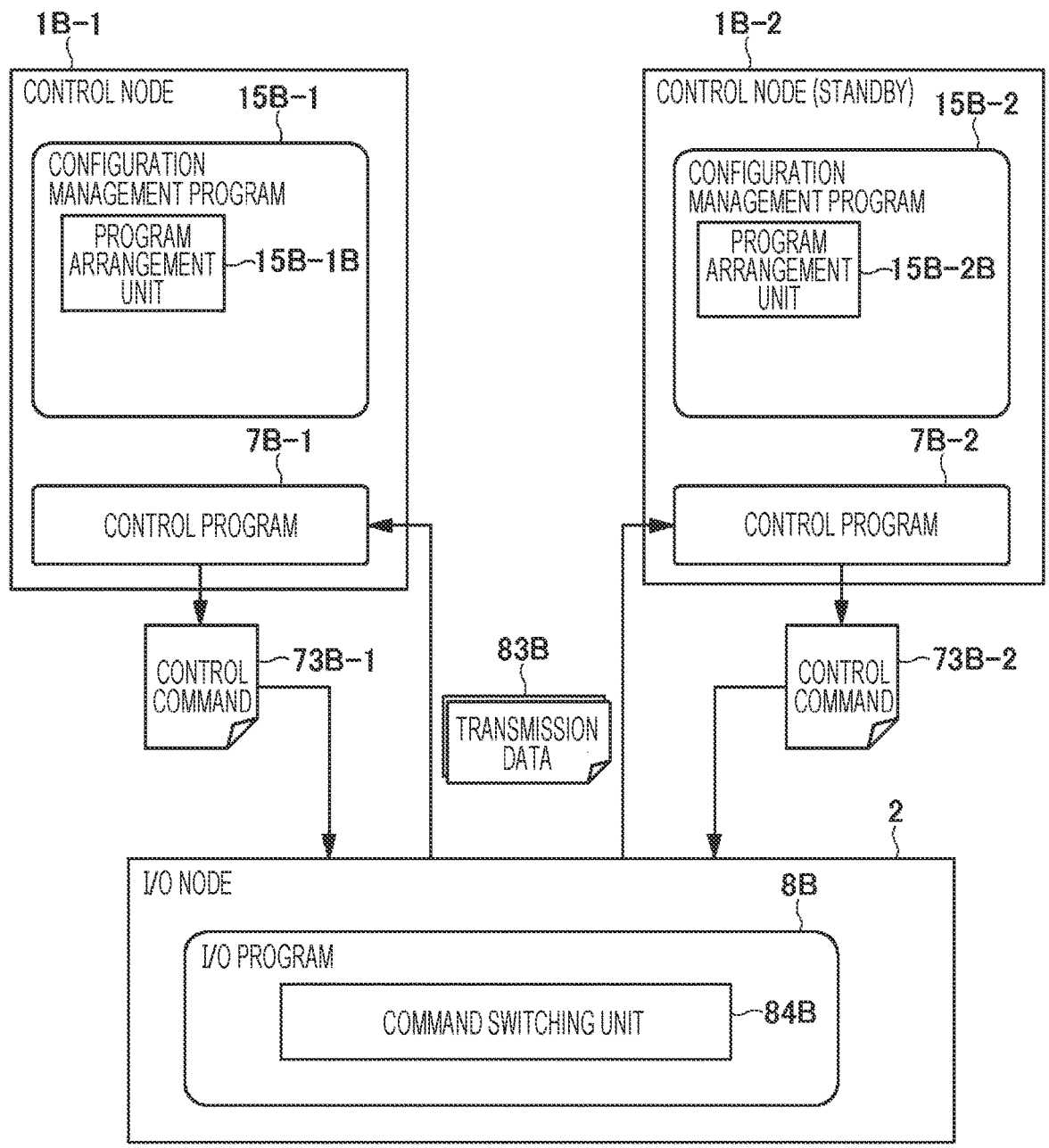
FIG. 24 is a block diagram illustrating an example of a control command switching operation according to the second embodiment of the present invention.

FIG. 24 is a block diagram illustrating an example of a control command switching operation according to the second embodiment;

The control programs 7B-1 and 7B-2 both transmit the control commands 73B-1 and 73B-2 according to the processing flow of the determination execution unit 70 illustrated in FIG. 5. Since the contents of the control programs 7B-1 and 7B-2 are the same, exactly the same contents are written in the control content columns 73d of the control commands 73B-1 and 73B-2.

The transmitted control commands 73B-1 and 73B-2 are received by the reception processing unit 81 of the I/O program 8B and processed by the command switching unit 84B according to the control command processing flow in FIG. 9. The program arrangement units 15B-1B and 15B-2B of the configuration management programs 15B-1 and 15B-2 notify the command switching unit 84 of the I/O program 8B, and add the IP addresses and the port numbers of the control programs 7B-1 and 7B-2 to the transmission source list 87. Accordingly, YES is determined in Step S844 in FIG. 9, and both the control commands 73B-1 and 73B-2 are not discarded in Step S846.

As described above, in Step S845, it is checked whether the same control command has already been registered. For example, when the control command 73B-1 arrives at the command switching unit 84, the control command 73B-2 is determined as YES in Step S845 and is discarded in Step S846. Through this process, the control command that always arrives is passed to the control command execution unit 80. In a case where the control node 1B-1 or 1B-2 fails, the control command 73B-1 or 73B-2 transmitted by the remaining one control node is passed to the control command execution unit 80 by the command switching unit 84B, whereby the control of the control system 100B is continued.

Hereinafter, a method of automatically realizing the recovery of the redundant configuration will be described using a case where the control node 1B-1 fails as an example.

Figure 25:
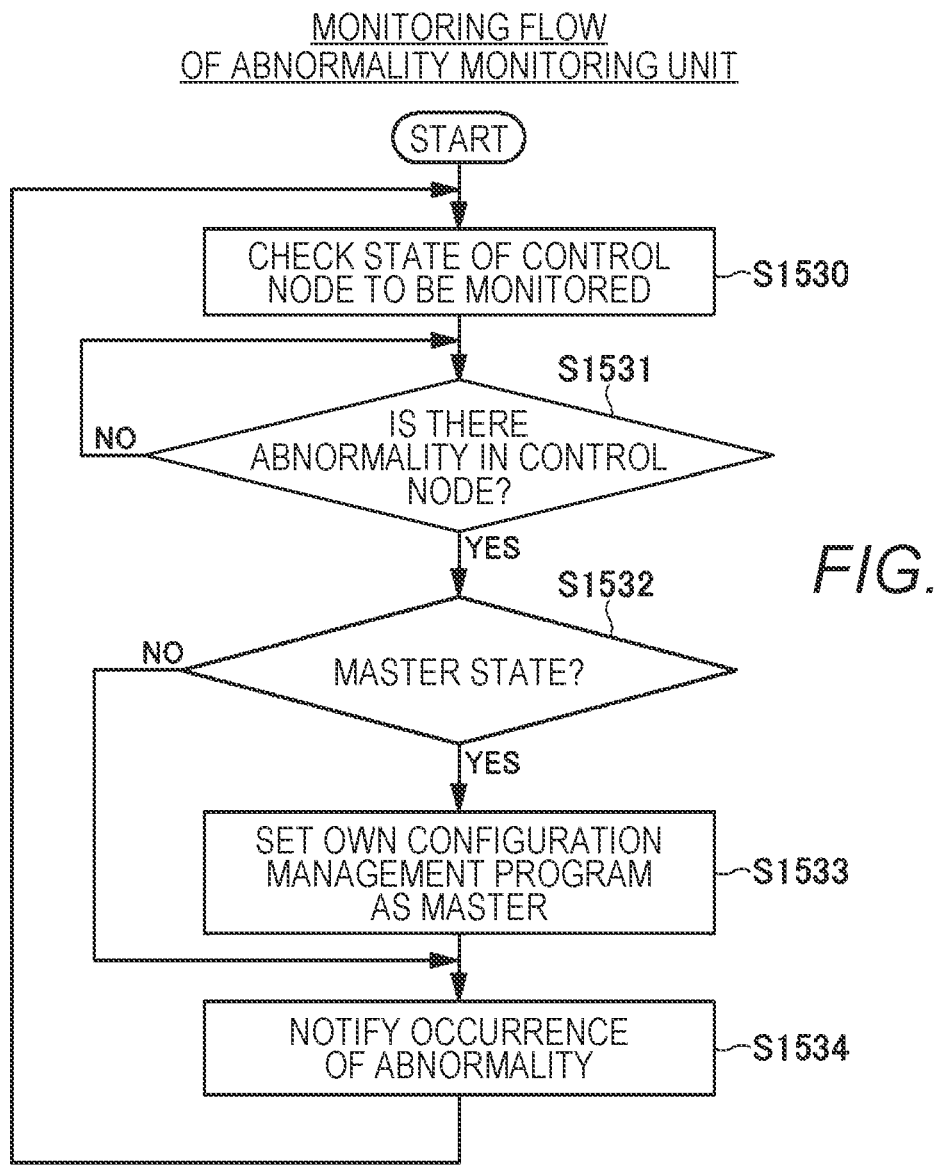
FIG. 25 is a flowchart illustrating a procedure example of monitoring processing of an abnormality monitoring unit.

As described above, the control itself is continued by the control program 7B-2 executed on the control node 1B-2, but the control system 100B stops when an abnormality also occurs in the control node 1B-2. Therefore, it is necessary to replace the failed control node by the new control node 1B-3 and recover the redundant configuration. The failure (abnormality) of each control node is detected by the abnormality monitoring unit 15C existing in each configuration management program 15. FIG. 25 illustrates a flowchart of monitoring processing of the abnormality monitoring unit 15C.

FIG. 25 is a flowchart illustrating a procedure example of the monitoring processing of the abnormality monitoring unit 15C.

The abnormality monitoring unit 15C checks the state of the control node to be monitored (S1530). For example, the abnormality monitoring unit 15C monitors whether or not there is an abnormality for a control node having a control node ID (for example, a number) smaller by one than that of the abnormality monitoring unit itself. The abnormality monitoring unit 15C of the control node having the control node ID "1" (minimum) monitors the control node having the maximum control node ID. That is, the control nodes 1B on the network 5 monitor each other in a row. In the configuration of the control system 100B illustrated in FIG. 13, the configuration management programs 15B-1 and 15B-2 monitor each other. Specific examples of the monitoring method include, but are not limited to, a method of checking whether there is a response by a ping response, and a method of checking whether the control node 1B to be monitored periodically transmits a control command.

Next, the abnormality monitoring unit 15C determines whether there is an abnormality in the control node to be monitored (S1531), and continues the process of determining the presence or absence of an abnormality when there is no abnormality in the control node (NO in S1531). When detecting the abnormality of the control node to be monitored (YES in S1531), the abnormality monitoring unit 15C first determines whether the configuration management program 15 of the control node in which the abnormality occurs is in the master state (S1532). When the corresponding configuration management program 15 is not in the master state (NO in S1532), the process proceeds to Step S1534.

Meanwhile, when the abnormality monitoring unit 15C determines that the control node to be monitored is in the master state (YES in S1532), the configuration management program 15 of the control node in which the abnormality has occurred is in the master state, and thus, the abnormality monitoring unit 15C sets its own configuration management program 15B-2 as the master (S1533).

Next, the abnormality monitoring unit 15C notifies the abnormality monitoring unit 15C of the configuration management program 15 in the master state and the HMI program 9B of occurrence of the abnormality, that is, information on the control node in which the abnormality occurs (S1534). In the present embodiment, the abnormality monitoring unit 15B-2C in the slave state detects the abnormality of the control node 1B-1 in the master state, sets the configuration management program 15B-2 to the master state, and notifies itself of the occurrence of the abnormality. After the processing of Step S1534, the abnormality monitoring unit 15C proceeds to Step S1530.

Figure 26:
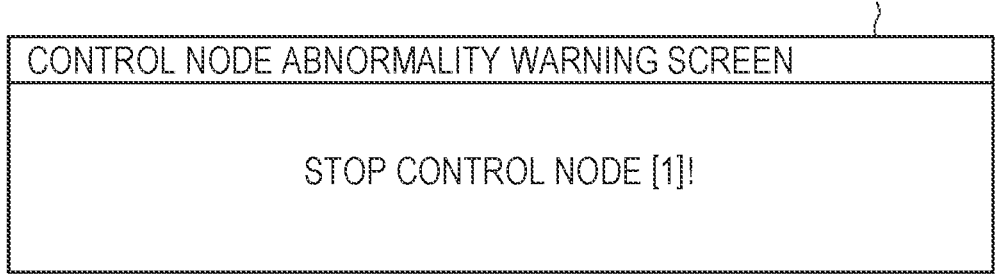
FIG. 26 is a table illustrating an example of a control node abnormality warning screen.

FIG. 26 illustrates an example of a control node abnormality warning screen.

The HMI program 9B receives the notification of the occurrence of the abnormality of the control node, and displays a control node abnormality warning screen 92 illustrated in FIG. 26 to notify the administrator 36 of the control system 100B of the abnormality of the control node. In FIG. 26, "stop control node [1]!" is displayed.

[Recovery Processing of Abnormality Monitoring Unit]

Figure 27:
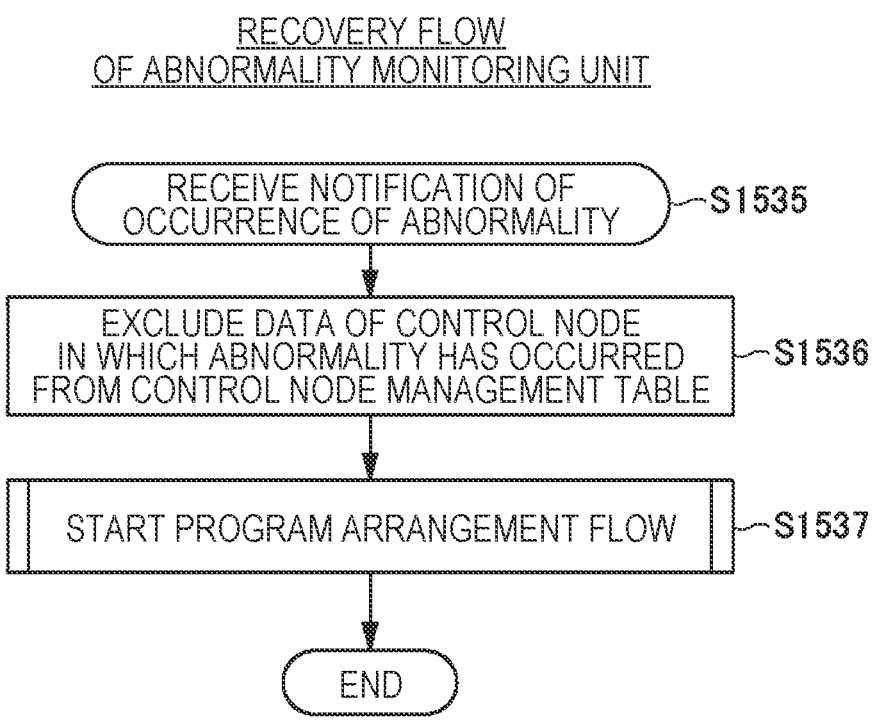
FIG. 27 is a flowchart illustrating a procedure example of recovery processing of an abnormality monitoring unit.

FIG. 27 is a flowchart illustrating a procedure example of the recovery processing of the abnormality monitoring unit 15C.

Upon receiving the notification of the occurrence of the abnormality in the control node 1B (S1535), the abnormality monitoring unit 15C of the configuration management program 15 in the master state starts the recovery flow illustrated in FIG. 27. A case where an abnormality occurs in the control node 1B-1 will be described as an example.

First, the abnormality monitoring unit 15C excludes information on the control node 1B-1 in which an abnormality has occurred from the control node management table 15G (S1536). Then, the abnormality monitoring unit 15C causes the program arrangement unit 15B to start the program arrangement flow illustrated in FIG. 21 (S1537). When there is a control node capable of executing the control program at this time on the network 5, the execution of the control program 7B is started by the program arrangement flow, and the redundant state is recovered.

[Example of Recovering Redundant Configuration Using Newly Connected Control Node]

Next, with reference to FIG. 13 again, an operation in a case where a new control node 1B is connected to the network 5 as the control node 1B-3 in a state where the control node 1B-1 has failed will be described.

The configuration management program 15B-3 starts to be executed on the control node 1B-3, and the configuration management program 15B-3 becomes a slave state along the start flow (FIG. 16) of the master selection unit 15B-3A. Then, in Step S1505 in FIG. 16, the master selection unit 15B-3A notifies the master selection unit 15B-2A that the control node 1B-3 is available in the slave state.

Accordingly, the control node management flow illustrated in FIG. 17 is started in the master selection unit 15B-2A of the control node 1B-2 (S1507). Then, the master selection unit 15B-2A adds the information on the control node 1B-3 to the control node management table 15B-2G (S1508), and the program arrangement flow is started (S1509). The newly connected control node 1B-3 is added as a slave. Then, in the program arrangement flow, the control program 7B starts to be executed on the control node 1B-3, and the control program 7B recovers to a redundant state again.

The control programs 7B-1, 7B-2, and 7B-3 in the present embodiment do not need to manage the states of other control programs. As in the case of executing the control program without redundancy, it is sufficient to create a program for generating the control command 73, and thus, the development of the control program is relatively easy.

According to the second embodiment described above, in addition to the effects of the first embodiment, there is an effect that a control system capable of making resources (computer, software) redundant can be realized. Therefore, the availability of the control system is improved.

First Modification of Second Embodiment

Next, as a first modification of the second embodiment, an example in which a normal monitoring program is introduced into a control node will be described with reference to FIG. 28.

Figure 28:
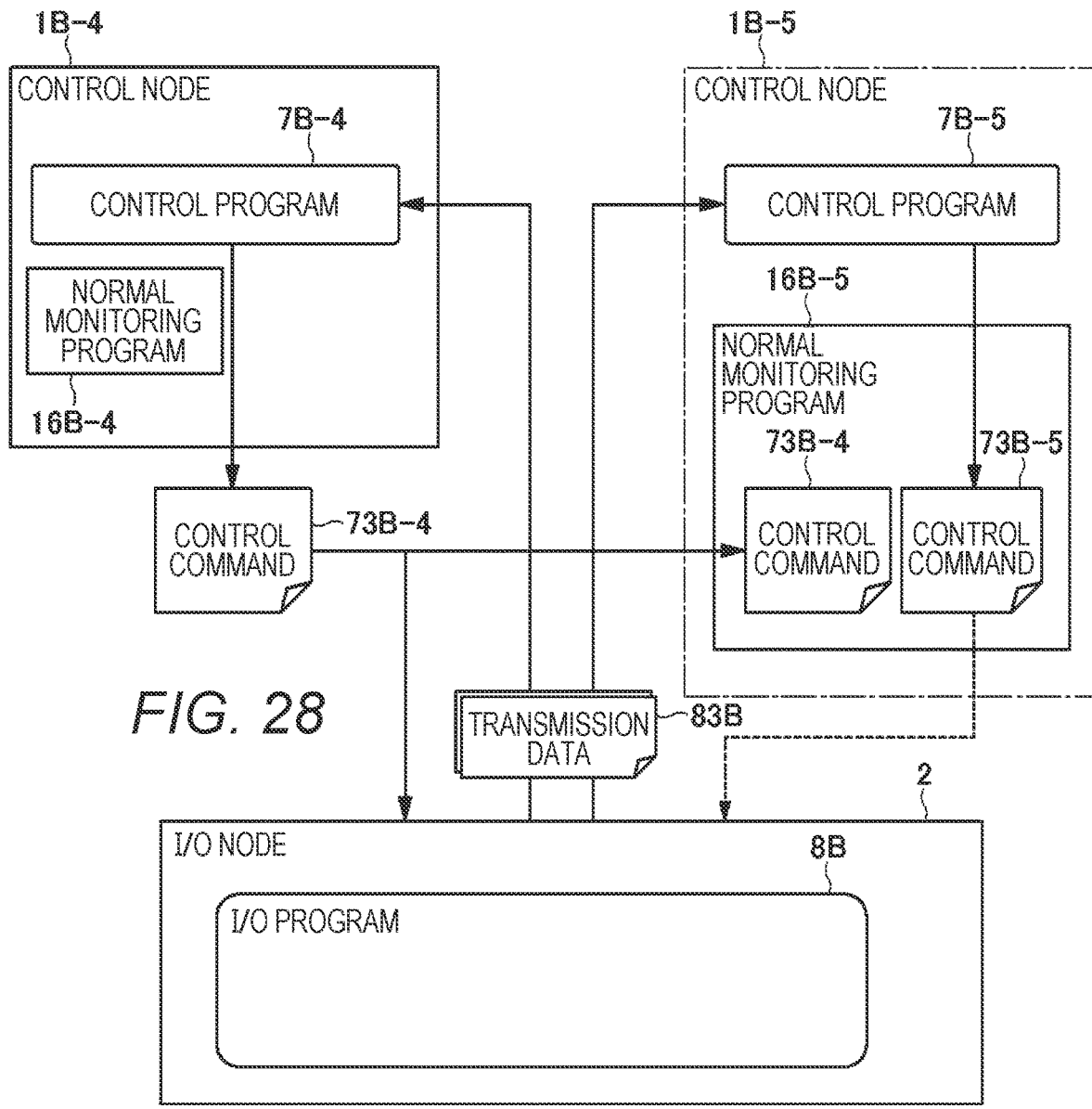
FIG. 28 is a block diagram illustrating an example in which a normal monitoring program is introduced into a control node according to a first modification of the second embodiment of the present invention.

FIG. 28 is a block diagram illustrating an example in which the normal monitoring program is introduced into the control node according to the first modification of the second embodiment;

In the configurations of the embodiments described above, in the control commands 73B-1 and 73B-2, the control command to be executed is selected by the command switching unit 84B, but the present invention is not limited to this example. For example, as illustrated in FIG. 28, the normal monitoring programs 16B-4 and 16B-5 may be provided in the control nodes 1B-4 and 1B-5, respectively.

In the control system 100B illustrated in FIG. 28, the normal monitoring programs 16B-4 and 16B-5 become standby systems when the control nodes executing the same control program 7B exist on the network 5. Then, the normal monitoring program 16B-5 receives the control command 73B-4 transmitted by the control program 7B-4 of the control node 1B-4, and monitors whether the control node 1B-4 is transmitting the control command 73B-4. Since the normal monitoring program 16B-5 receives the control command 73B-4 for the purpose of confirming whether the control node 1B-4 is normally transmitting the control command, the received control command 73B-4 is not transmitted to the I/O node 2.

Here, when the control node 1B-4 transmits the control command 73B-4, the normal monitoring program 16B-5 discards the control command 73B-5 generated by the control program 7B-5 of the control node 1B-5. In addition, the normal monitoring program 16B-5 may determine that the control node 1B-4 has failed when the control command 73B-4 is not transmitted even after a certain period of time, and thereafter transmit the control command 73B-5 from the normal monitoring program 16B-5 to the I/O node 2. When there is no other control node executing the same control program 7B on the same network 5, the normal monitoring program does nothing.

Second Modification of Second Embodiment

Figure 29:
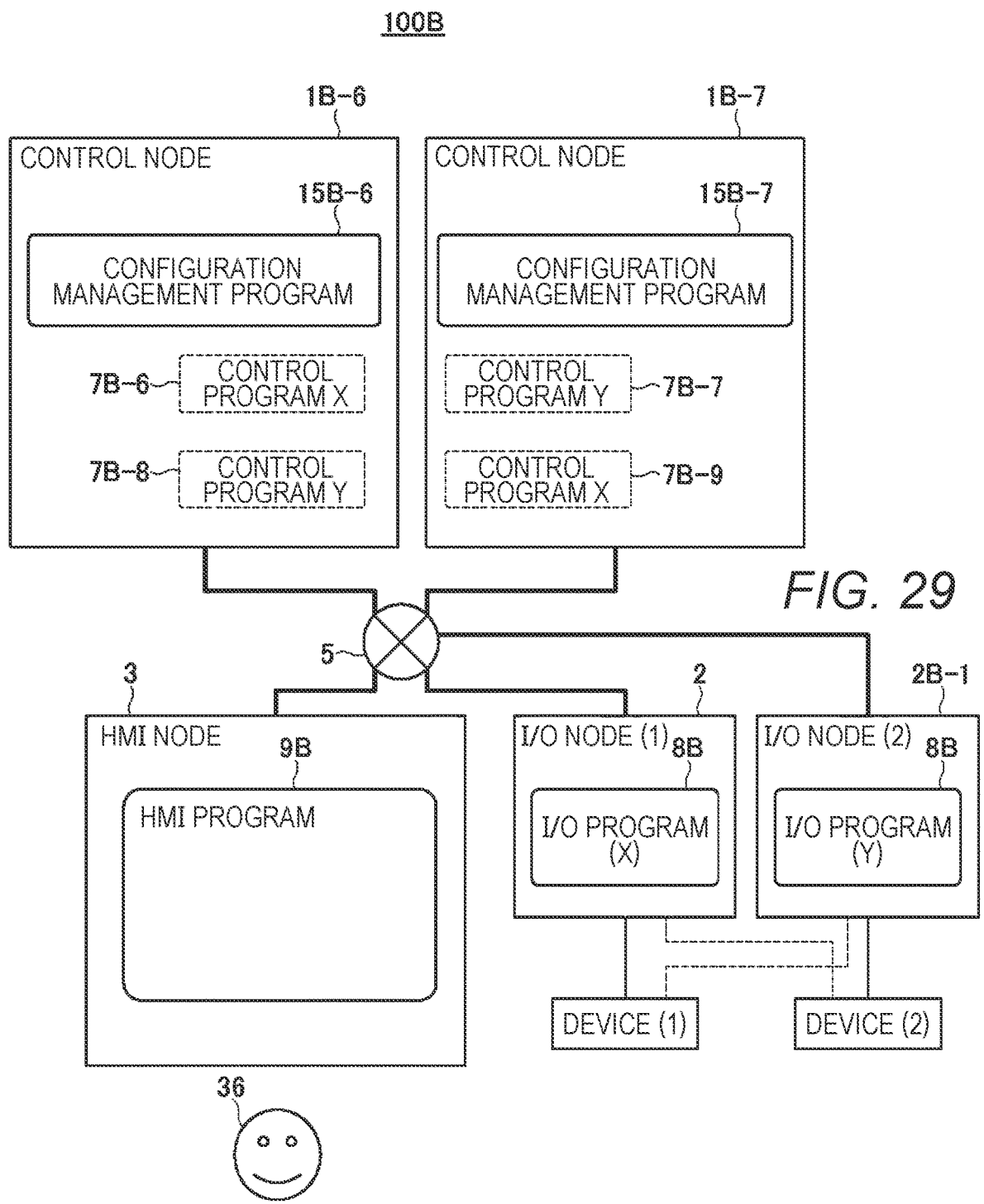
FIG. 29 is a block diagram illustrating an example of operating a plurality of control programs on one control node according to a second modification of the second embodiment of the present invention.

FIG. 29 is a block diagram illustrating an example in which a plurality of control programs is operated on one control node according to a second modification of the second embodiment.

In the configurations of the embodiments described above, one type of control program is executed on one control node, but a plurality of control programs may be operated on one control node. As illustrated in FIG. 29, for example, an I/O program (X) is stored as an I/O program 8B in an I/O node 2 (I/O node (1)) that controls the device (1), and an I/O program (Y) is stored as an I/O program 8B in an I/O node 2B-1 (I/O node (2)) that controls the device (2). Meanwhile, the control programs (X) 7B-6 and 7B-9 that control the two I/O nodes 2 and 2B-1 and the control programs (Y) 7B-7 and 7B-8 are appropriately arranged on the two control nodes 1B-6 and 1B-7. Note that each of the I/O nodes 2 and 2B-1 may be able to control the devices (1) and (2).

As an example, a control program (X) 7B-6, a control program (Y) 7B-8, and a configuration management program 15B-6 are arranged in the control node 1B-6. In addition, a control program (Y) 7B-7, a control program (X) 7B-9, and a configuration management program 15B-7 are arranged in the control node 1B-7. With such a configuration, even when any one of the control nodes 1B-6 and 1B-7 fails, the control is continued, and the number of control nodes may be the same as the number of I/O nodes.

In the configuration illustrated in FIG. 24 described above, the command switching unit 84B selects a first-come, first-served control command of the control commands 73B-1 and 73B-2, and executes the corresponding control command, thereby performing only redundancy. However, in the case of using a control program that may make an erroneous determination depending on the situation, a configuration in which a plurality of control programs are operated on one control node can be used for improving reliability.

That is, the control system is configured to execute three or more same control programs on the same network 5. Then, in this control system, when the contents of the control commands transmitted by the control programs received at the same timing do not all match, the command switching unit 84B passes, to the control command execution unit 80, a control command that comes first in a large number of control commands with the same control contents.

According to the second modification of the second embodiment described above, it is possible to change the resource used in the control system (the control node in the above example) without stopping the control system while maintaining reliability and punctuality. In addition, it is possible to realize a control system capable of making resources (computer, software) redundant. Therefore, the availability of the control system is improved.

As described above, in the control system (control system 100B) according to the second embodiment, the I/O program (I/O program 8B) includes the command switching unit (command switching unit 84B) that selects a control command to be executed from the plurality of control commands received from the plurality of control programs, and the control program is executed on at least two control nodes (control nodes 1B-1 to 1B-3). The command switching unit is configured to send only the control command received from the control node to the control command execution unit (control command execution unit 80).

In the control system (control system 100B) according to the second embodiment, the I/O program (I/O program 8B) includes the command switching unit (command switching unit 84B) that selects the control command to be executed from the plurality of control commands received from the plurality of control programs, and the control program is executed on at least three control nodes (control nodes 1B-1 to 1B-3). The command switching unit is configured to compare control contents of control commands received at the same timing, and when control commands having different control contents are included, select a large number of control commands having the same control contents and transmit the selected control commands to the control command execution unit (control command execution unit 80).

In the control system (control system 100B) according to the second embodiment, each control node includes the configuration management program (configuration management program 15).

The configuration management program includes the master selection unit (master selection unit 15A) that selects the control node operating in the master state from among the plurality of control nodes, sets its own control node to the slave state, sets its own control node to the master state when there is no control node in the master state, and transmits information on its own control node to other control nodes; the information synchronization unit (table synchronization unit 15E) that synchronizes information on each control node in the control node in the master state and the control node in the slave state with the control node management table (control node management table 15G) included in each control node, the program registration unit (program registration unit 15D) that receives information on the control program and information on a redundant configuration setting designated by a user interface, the program arrangement unit (program arrangement unit 15B) that, when the redundant configuration is requested, refers to the control node management table to determine two or more control nodes that execute the control program in the redundant configuration and cause the determined control nodes to execute the control program, and the abnormality monitoring unit (abnormality monitoring unit 15C) that monitors the control node and detects an abnormality.

Then, in the control system, in the configuration management program in the master state, when the abnormality monitoring unit receives the notification of the abnormality of the control node in the slave state, the information synchronization unit excludes the control node having an abnormality from the control node management table, and the program arrangement unit selects another control node capable of executing the control program from the control node management table and causes the selected control node to execute the control program.

Further, in the control system (control system 100B) according to the second embodiment, in a case where there is no other control node capable of executing the control program in the control node management table (control node management table 15G), when a new control node (control node 1B-3) is connected to the network, the master selection unit (master selection unit 15A) detects the connection and adds information on the new control node to the control node management table, and the program arrangement unit (program arrangement unit 15B) determines the control node added to the control node management table as the control node that executes the control program in the redundant configuration.

Further, in the control system (control system 100B) according to the second embodiment, in the configuration management program (configuration management program 15) in the slave state, when the abnormality monitoring unit (abnormality monitoring unit 15C) detects an abnormality in the control node in the master state, the master selection unit (master selection unit 15A) newly sets its own control node to the master state.

3. Third Embodiment

Next, as a third embodiment, a method of executing (scaling out) processing of a control program in a distributed manner by a plurality of control nodes will be described.

Figure 30:
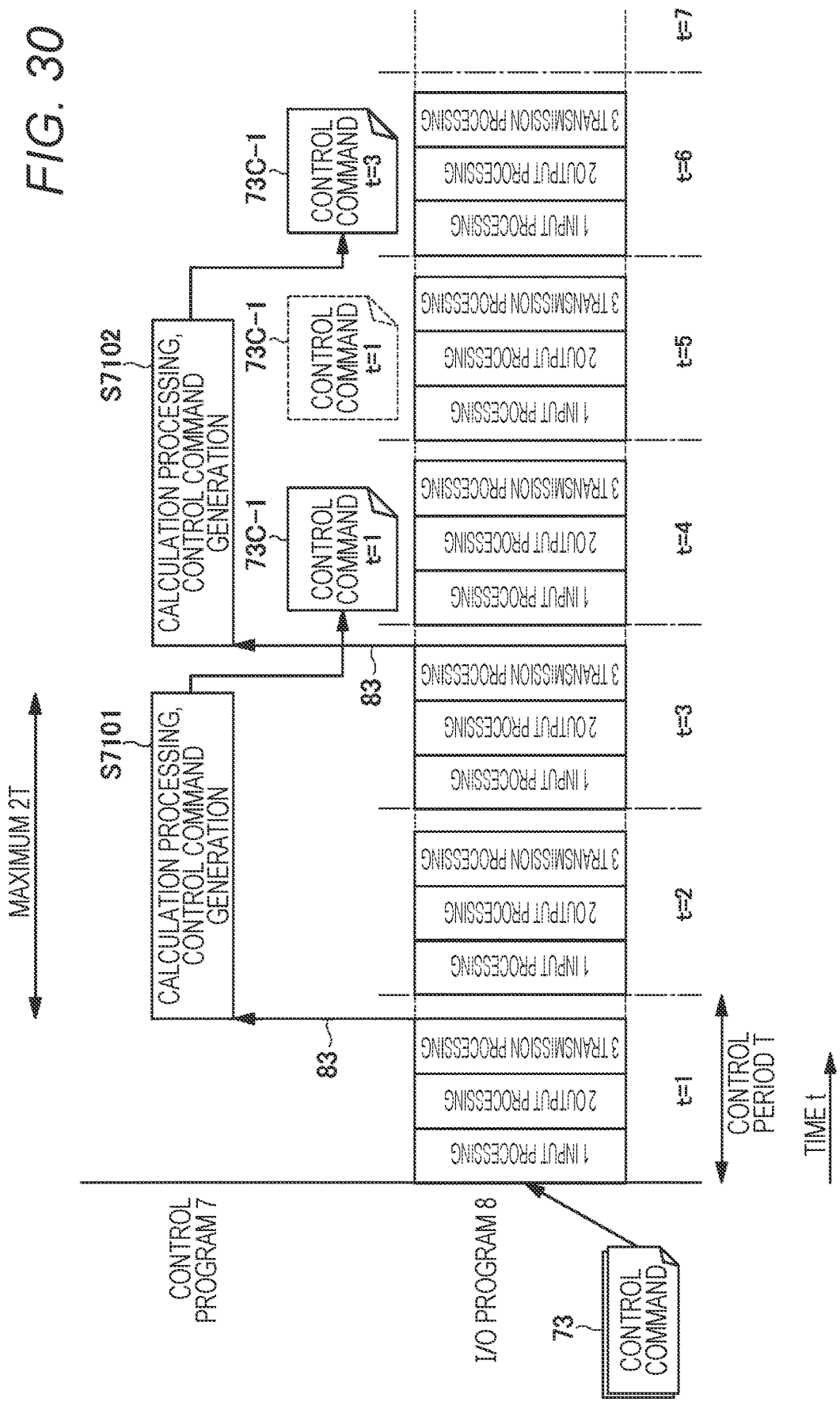
FIG. 30 is a table illustrating an example of execution timings of a control program and an I/O program of the control system according to the first embodiment of the present invention.

FIG. 30 illustrates an example of execution timings of the control program and the I/O program of the control system according to the first embodiment. The example illustrated in FIG. 30 illustrates execution timings of the control program 7 and the I/O program 8 in time series in the configuration of the control system 100 illustrated in FIG. 2.

At time t=1, the I/O program 8 that has received the control command 73 transmits the transmission data 83. The transmission data 83 is received by the control program 7, and the control program 7 generates the control command 73 (S7101). When the series of processing of the control program 7 takes a time of up to 2T, the control command 73C-1 based on the transmission data 83 at time t=1 is executed at time t=4. At time t=5, since the new control command 73 has not arrived, control based on the control command 73C-1 (broken line) received at time t=4 is performed.

Furthermore, at time t=6, the control command 73C-1 generated (S7102) based on the transmission data 83 at time t=3 is executed. At time t=7, the new control command 73 has not arrived. That is, at the time t=5, 7, . . . , 2n+5 (n≥0), only the control based on the control command 73 at the time of 4T in the past can be performed. When the maximum processing time of the control program 7 is longer than 2T, the interval at which the control command 73 is transmitted also becomes long.

Figure 31:
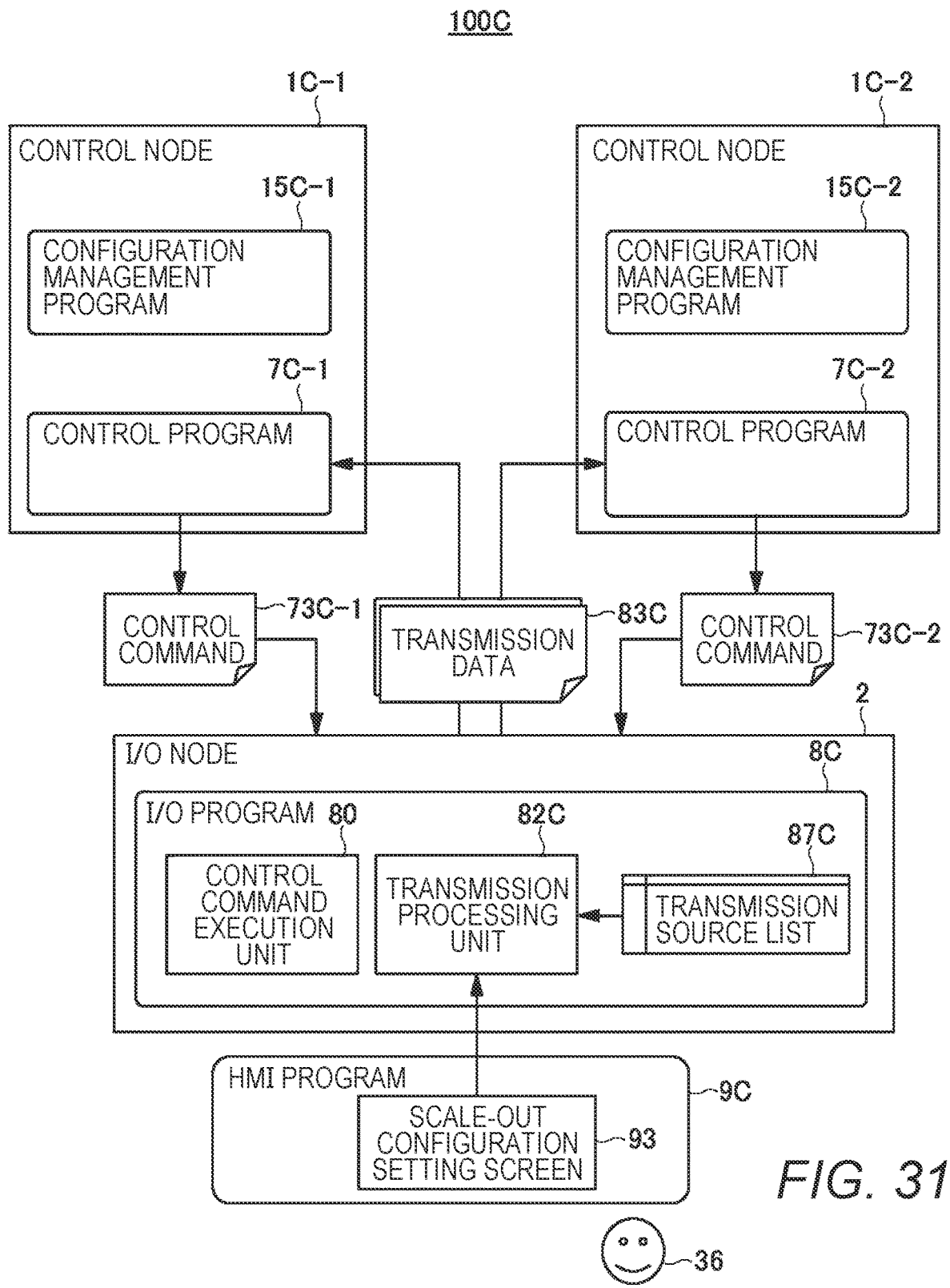
FIG. 31 It depicts a block diagram illustrating an example of an overall configuration of a control system according to a third embodiment of the present invention.

FIG. 31 is a block diagram illustrating an example of an overall configuration of a control system according to a third embodiment.

In order to realize control with a short delay time, a control system 100C is configured as illustrated in FIG. 31. The two control nodes 1B used in the second embodiment are set as control nodes 1C-1 and 1C-2, respectively, and the same control program 7 is executed. The control programs 7 are referred to as control programs 7C-1 and 7C-2, respectively. In FIG. 31, a control program 7C-1 and a configuration management program 15C-1 are arranged in the control node 1C-1, and a control program 7C-2 and a configuration management program 15C-2 are arranged in the control node 1C-2. The I/O node 2 executes an I/O program 8C.

Figure 32:
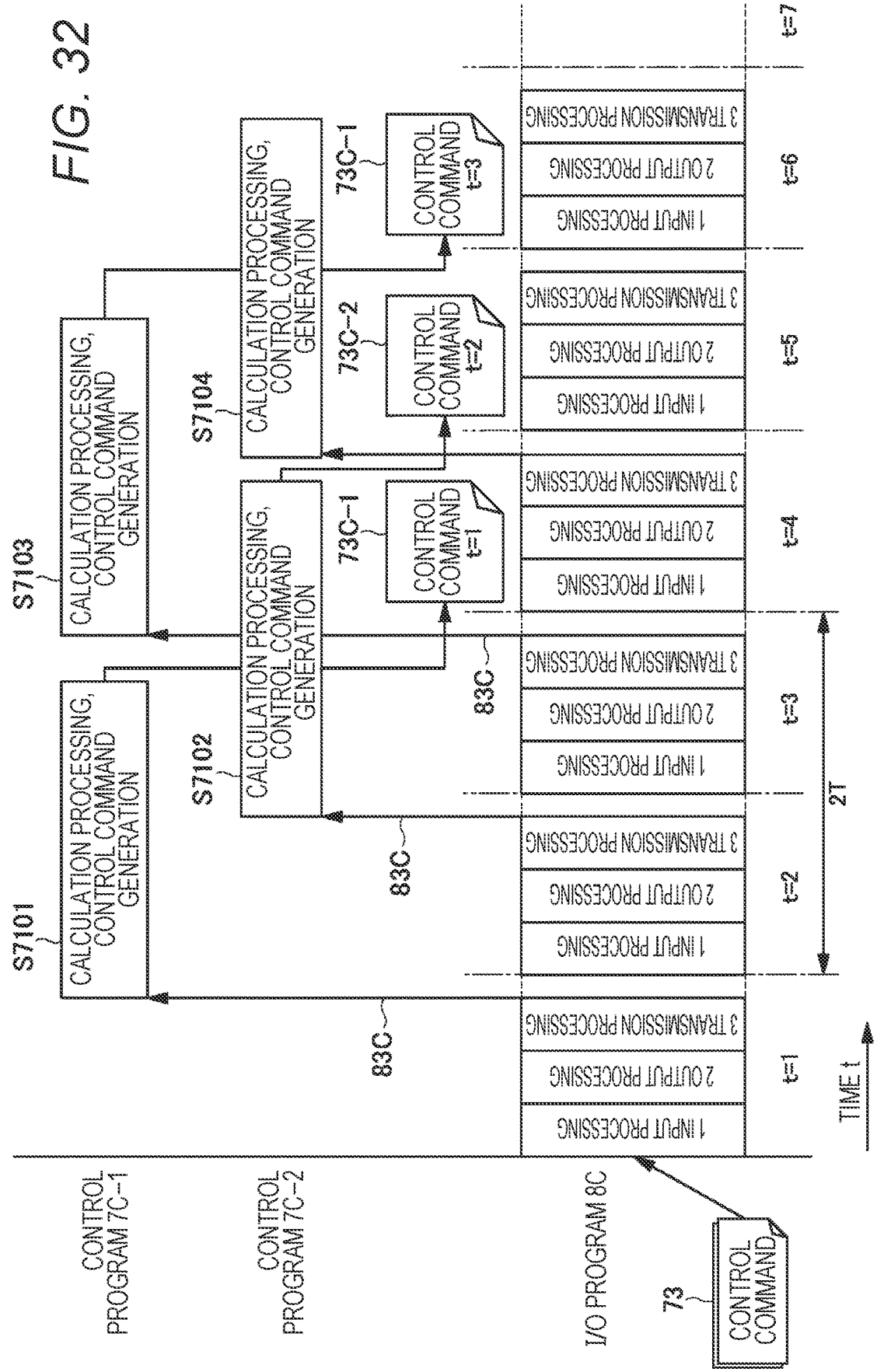
FIG. 32 is a table illustrating an example of execution timings of a control program and an I/O program of the control system according to the third embodiment of the present invention.

FIG. 32 illustrates an example of execution timings of the control program and the I/O program of the control system according to the third embodiment.

First, how control is performed in the configuration of the control system 100C will be described with reference to FIG. 32. The transmission data 83C generated at the time t=1 is processed by the control program 7C-1 (S7101), and the generated control command 73C-1 is executed by the control command execution unit 80 of the I/O program 8C at the time t=4. Next, the transmission data 83C generated at the time t=2 is processed by the control program 7C-2 from the middle of the processing of Step S7101 (S7102), and the generated control command 73C-2 is executed by the control command execution unit 80 at the time t=5. Next, the processing of the transmission data 83C generated at the time t=3 is started by the control program 7C-1 in the middle of the process of Step S7102 (S7103).

As described above, the control programs 7C-1 and 7C-2 sequentially process the transmission data 83C (S7101 to S7104), and thus, the control command execution unit 80 always executes the latest control commands 73C-1 and 73C-2. As a result, the control of the device 4 can be executed with a small delay time.

Even when the maximum time required to execute the control program 7 is longer than 2T, the delay time can be shortened by adding three or four control nodes 1B in accordance with the required delay time. Therefore, for example, even in a case where the performance of the entire control system 100C is insufficient later, it is possible to measure the performance improvement by adding the control node 1B each time. In addition, the present embodiment requires less cost than replacement with a high-performance computer and enables efficient investment.

The I/O program 8C is obtained by additionally modifying some functions of the I/O program 8, and includes a transmission processing unit 82C, a command switching unit 84 (not illustrated), a transmission source list 87C (refer to FIG. 35), and a scale-out configuration table 89 (refer to FIG. 36) as illustrated in FIG. 31. The HMI program 9C used in this configuration has a scale-out configuration setting screen 93.

The administrator 36 of the control system 100C first operates the control program 7C in the redundant configuration by the method described in the second embodiment. Next, the administrator 36 uses the scale-out configuration setting screen 93 to send a signal to the transmission processing unit 82C of the I/O program 8C to take the scale-out configuration. A specific example of the scale-out configuration setting screen 93 is illustrated in FIG. 33.

Figure 33:
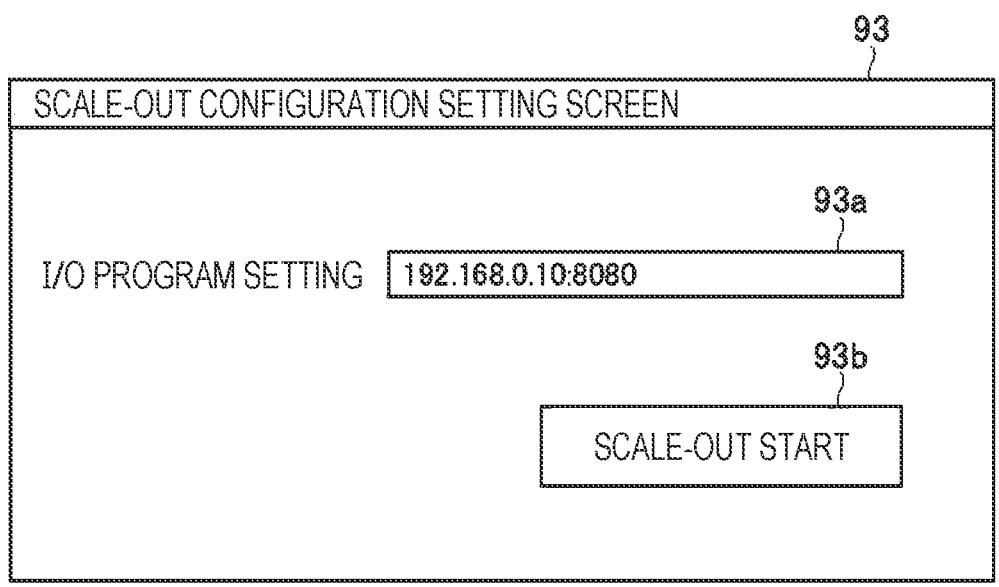
FIG. 33 is a table illustrating an example of a scale-out configuration setting screen.

FIG. 33 illustrates an example of the scale-out configuration setting screen 93.

The scale-out configuration setting screen 93 includes an I/O program setting column 93a and a scale-out start button 93b. When the scale-out start button 93b is pressed, a scale-out start signal is transmitted to the transmission processing unit 82C of the I/O program 8. The transmission processing unit 82C that has received the scale-out start signal transmits (distributes) the transmission data 83C in the order set for the target control node.

[Scale-Out Configuration Start Processing of Transmission Processing Unit]

Figure 34:
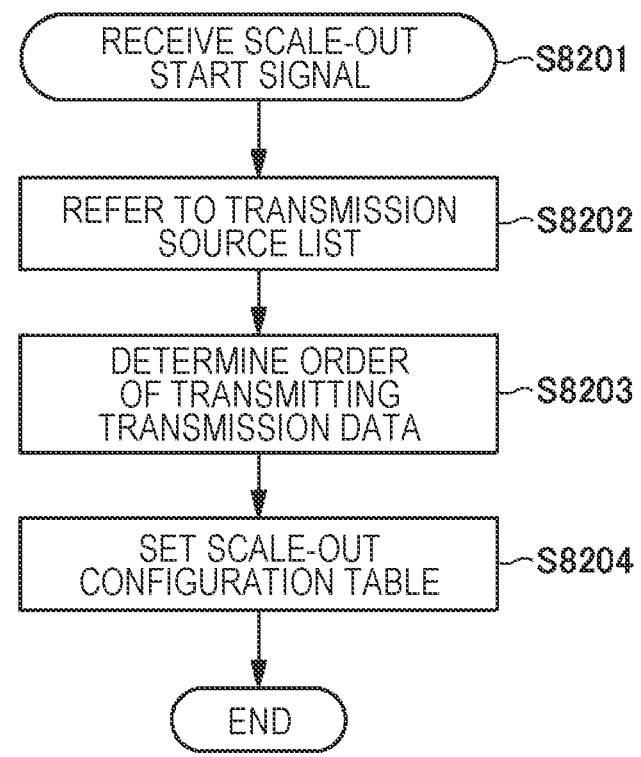
FIG. 34 is a flowchart illustrating a procedure example of scale-out configuration start processing of a transmission processing unit.

FIG. 34 is a flowchart illustrating a procedure example of scale-out configuration start processing of the transmission processing unit 82C.

Upon receiving the scale-out start signal from the HMI program 9C (S8201), the transmission processing unit 82C starts the scale-out configuration start flow illustrated in FIG. 34. First, the transmission processing unit 82C refers to the transmission source list 87C illustrated in FIG. 35 (S8202).

FIG. 35 illustrates an example of a structure of the transmission source list 87C.

The transmission source list 87C includes at least a transmission source column 87a and an order column 87b.

The transmission source column 87a stores an IP address and a port number for specifying a control program (for example, control commands 73C1 and 73C2) for generating control commands (for example, control commands 73C1 and 73C2).

The order column 87b stores the execution order of a plurality of control programs designated from the control programs.

For example, the control command 73 includes information on a transmission source and an order for specifying the control program, and the command switching unit 84 can create the transmission source list 87C using the information.

Next, the transmission processing unit 82C determines the order of transmitting the transmission data 83C to the control program based on the content of the transmission source list 87C (S8203), and sets the scale-out configuration table 89 (S8204). After Step S8204 ends, the processing of this flowchart ends.

FIG. 36 illustrates an example structure of the scale-out configuration table 89.

Like the transmission source list 87C, the scale-out configuration table 89 includes at least a transmission source column 89*a* and an order column 89*b*. The information in each column of the scale-out configuration table 89 is obtained from the transmission source list 87C.

The transmission source column 89*a* stores an IP address and a port number for specifying a control program (for example, control commands 73C1 and 73C2) for generating control commands (for example, control commands 73C1 and 73C2).

The order column 89*b* stores the execution order of the plurality of control programs. In the order column 89*b*, numerical values are set in order from 1, whereby the order of transmitting the transmission data 83C is defined.

[Transmission Processing by Transmission Processing Unit]

Figure 37:
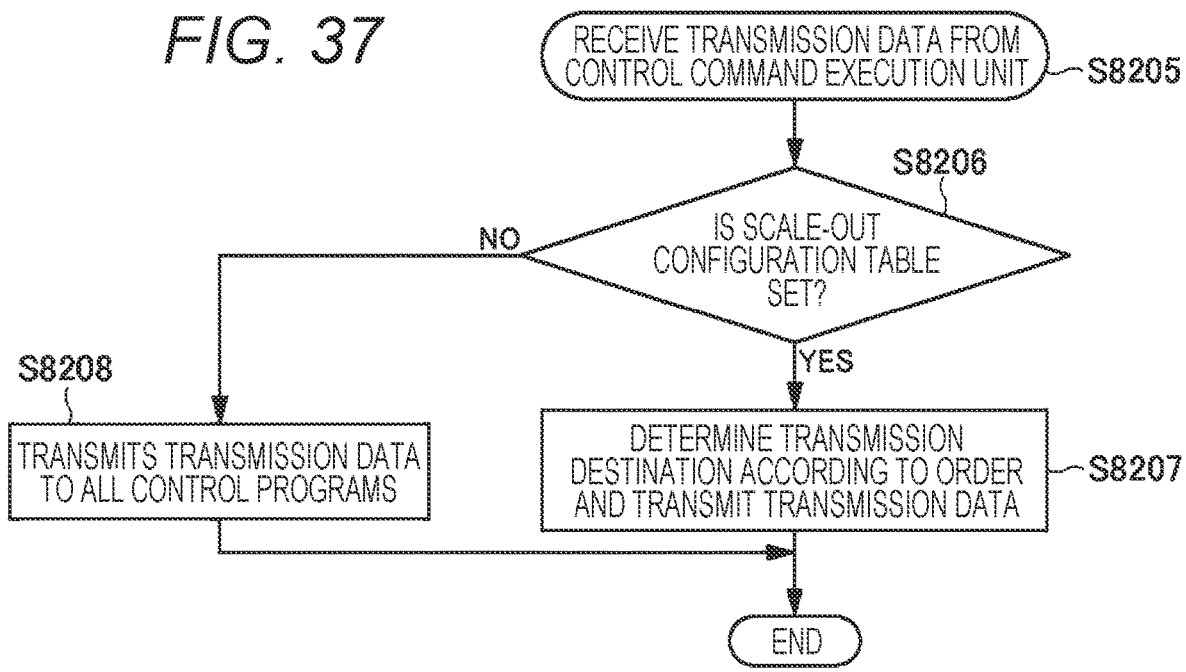
FIG. 37 is a flowchart illustrating a procedure example of transmission processing of the transmission processing unit.

FIG. 37 is a flowchart illustrating a procedure example of transmission processing of the transmission processing unit 82C.

The transmission processing unit 82C receives the transmission data 83C from the control command execution unit 80 (S8205), and starts the transmission processing flow illustrated in FIG. 37.

First, the transmission processing unit 82C checks whether the scale-out configuration table 89 exists (S8206). When the scale-out configuration table 89 is set (YES in S8206), the transmission processing unit 82C determines a transmission destination (destination control program) according to the order of the order column 89*b*, and transmits transmission data (S8207). That is, the transmission processing unit 82C transmits the transmission data 83C to the control program 7C-1 in the order "1" in the scale-out configuration table 89, for example. Then, when the next transmission processing flow is executed, the transmission data 83C is transmitted to the control program 7C-2 in the order "2". When the transmission data is transmitted to all the control programs listed in the scale-out configuration table 89, the transmission data is transmitted again from the order "1".

Meanwhile, when the scale-out configuration table 89 is not set (NO in S8206), the transmission processing unit 82C transmits the transmission data to all the control programs on the network 5 as in the first embodiment or the second embodiment (S8208). After the processing of Step S8207 or S8208, the processing of this flowchart ends.

Since the control node 1 executes the control program 7 on the general-purpose OS 14, the maximum time required for processing cannot be guaranteed. Therefore, in practice, it is necessary to configure the control system using the number of control nodes 1 having a margin larger than the minimum required number.

As described above, the control system (control system 100C) according to the third embodiment is configured such that at least two control nodes (control nodes 1C-1 and 1C-2) sequentially receive the result of processing by the I/O program (I/O program 8C) of the I/O node (I/O node 2), and in each control node, the determination execution unit (for example, determination execution unit 70) of the control program (control programs 7C-1 and 7C-2) generates the control command based on the received result of the processing, and sequentially transmits the control command to the I/O node.

According to the third embodiment described above, it is possible to realize a control system capable of scale-out (distribution of calculation processing) in addition to the effects of the first embodiment. Therefore, the performance of the control system can be improved.

4. Fourth Embodiment

Next, a method for realizing a redundant configuration using two or more I/O nodes 2 will be described.

Figure 38:
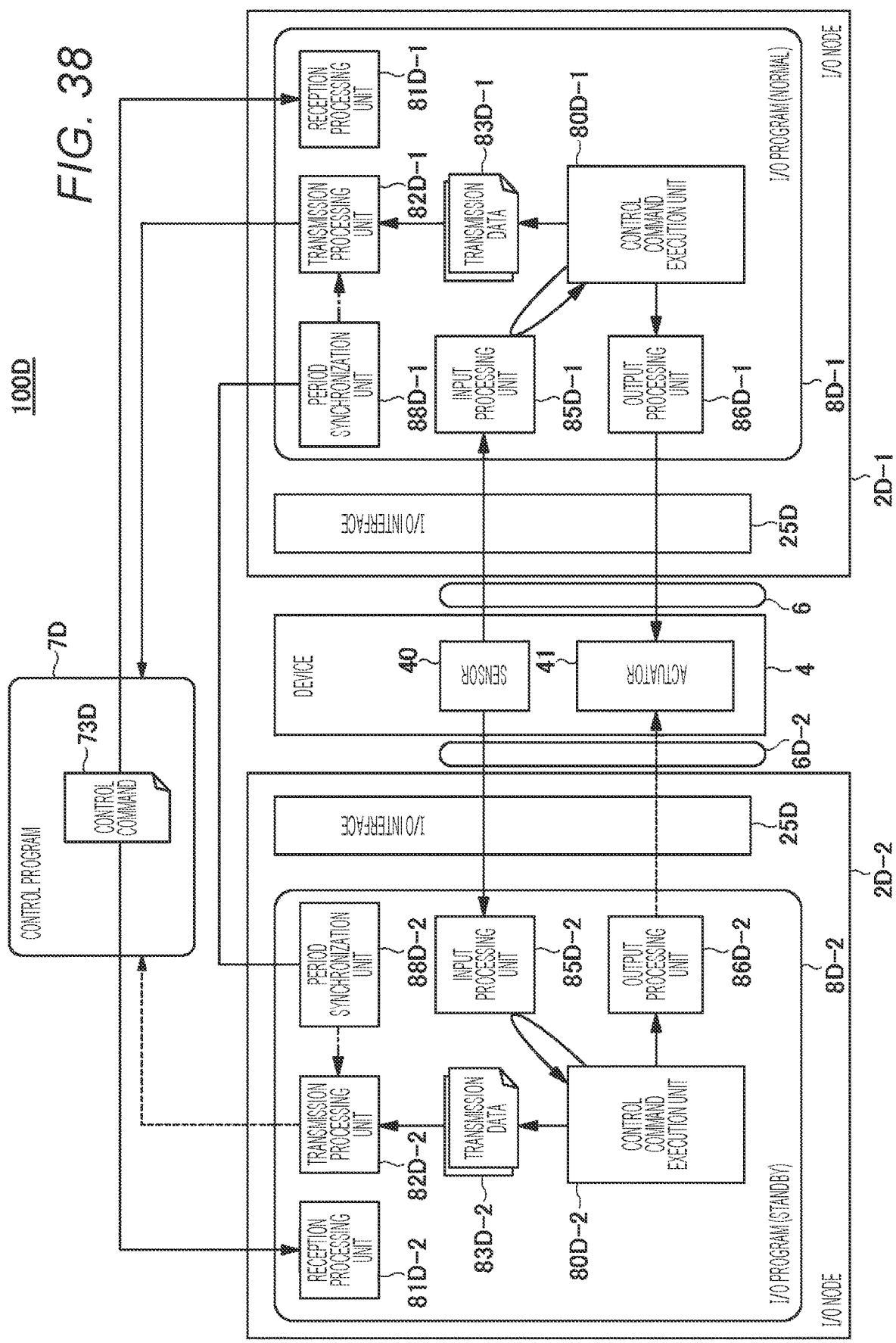
FIG. 38 is a block diagram illustrating an example of an overall configuration of a control system according to a fourth embodiment of the present invention.

FIG. 38 is a block diagram illustrating an example of an overall configuration of a control system according to a fourth embodiment.

A control system 100D of the present embodiment uses two I/O nodes 2 as I/O nodes 2D-1 and 2D-2. The control system 100D has a configuration in which the I/O node 2D-1 is a normal system and the I/O node 2D-2 is added as a standby system. Normally, the I/O node 2D-1 controls the device 4, and when the I/O node 2D-1 fails, the I/O node 2D-2 controls the device 4 instead.

The I/O node 2D-1 is connected to the device 4 by the cable 6 as in the first embodiment. In addition, the I/O node 2D-2 is also connected to the device 4 using the cable 6D-2. For example, the cable 6 and the cable 6D-2 are connected in parallel to a terminal so that the I/O node 2D-1 and the I/O node 2D-2 can simultaneously acquire information from the sensor 40 of the device 4 and operate the actuator 41.

I/O programs 8D-1 and 8D-2 operating on the I/O nodes 2D-1 and 2D-2 respectively include period synchronization units 88D-1 and 88D-2.

The period synchronization unit 88D-1 operates as a server, and distributes time information of a clock used as a reference of a control period by a control command execution unit 80D-1 via a network 5.

The period synchronization unit 88D-2 operates as a client, and adjusts a clock of a control command execution unit 80D-2 based on the time received from the period synchronization unit 88D-1 to match the timing of the control period.

A protocol defined in IEEE1588 or IEEE802.1 AS can be used to implement the period synchronization units 88D-1 and 88D-2, but the present invention is not limited thereto as long as the timing can be matched with accuracy required for controlling the device 4. In addition, the period synchronization unit 88D-2 may determine that the I/O node 2D-1 is abnormal when the time cannot be received from the period synchronization unit 88D-1.

A control program 7D generates a control command 73D and transmits the control command 73D to the I/O programs 8D-1 and 8D-2. Both of the I/O programs 8D-1 and 8D-2 similarly process the control command 73D. Since the I/O programs 8D-1 and 8D-2 have the same control period and process the same control command 73D, the same input processing and output processing are performed on the device 4 at the same timing. When an abnormality occurs in the I/O node 2D-1, the control of the device 4 is continued by the I/O program 8D-2.

When receiving a notification from the control command execution unit 80D-2 to transmit the transmission data 83D-2, the transmission processing unit 82D-2 of the I/O program 8D-2 checks with the period synchronization unit 88D-2 to determine the presence or absence of abnormality of the I/O node 2D-1. The transmission processing unit 82D-2 does not transmit and discards the transmission data 83D-2 when the I/O node 2D-1 is normal, and transmits the transmission data 83D-2 to the control program 7D when the I/O node 2D-1 is abnormal. Accordingly, data is transmitted from only one of the I/O programs 8D-1 and 8D-2 to the control program 7D.

In FIG. 38, the I/O program 8D-1 is provided with a reception processing unit 81D-1, a transmission processing unit 82D-1, an input processing unit 85D-1, and an output processing unit 86D-1, but these processing units are similar to the corresponding processing units of the first embodiment, and thus detailed descriptions thereof will be omitted. In addition, the I/O program 8D-2 is provided with a reception processing unit 81D-2, an input processing unit 85D-2, and an output processing unit 86D-2, but detailed descriptions thereof will be similarly omitted.

In a case where three or more I/O nodes are used, control periods are synchronized in a row in order to detect a failure of the I/O node by the period synchronization unit. That is, one standby system I/O node that performs control period synchronization from the period synchronization unit of one I/O node of the normal system and another standby system I/O node that performs control period synchronization from the period synchronization unit of the standby system I/O node are sequentially connected.

In the above example, the I/O program 8D-2 controls the device 4 in parallel even while the I/O program 8D-1 normally executes the control of the device 4, but the present invention is not limited to this example. For example, first, the output processing unit 86D-2 in the I/O program 8D-2 may be invalidated to ignore all instructions from the control command execution unit 80D-2, and the output processing unit 86D-2 may be validated to perform the output processing to the device 4 at the time point the period synchronization unit 88D-2 detects the abnormality of the I/O node 2D-1. In this case, it is also possible to cope with a case where the actuator 41 of the device 4 cannot receive a plurality of signals for control.

In addition, although the configuration of the present embodiment is used for redundancy of the I/O node, it can also be used as a scale-out configuration that distributes control processing. Hereinafter, an example in which the configuration of the present embodiment is used as a scale-out configuration will be described.

First Modification of Fourth Embodiment

Figure 39:
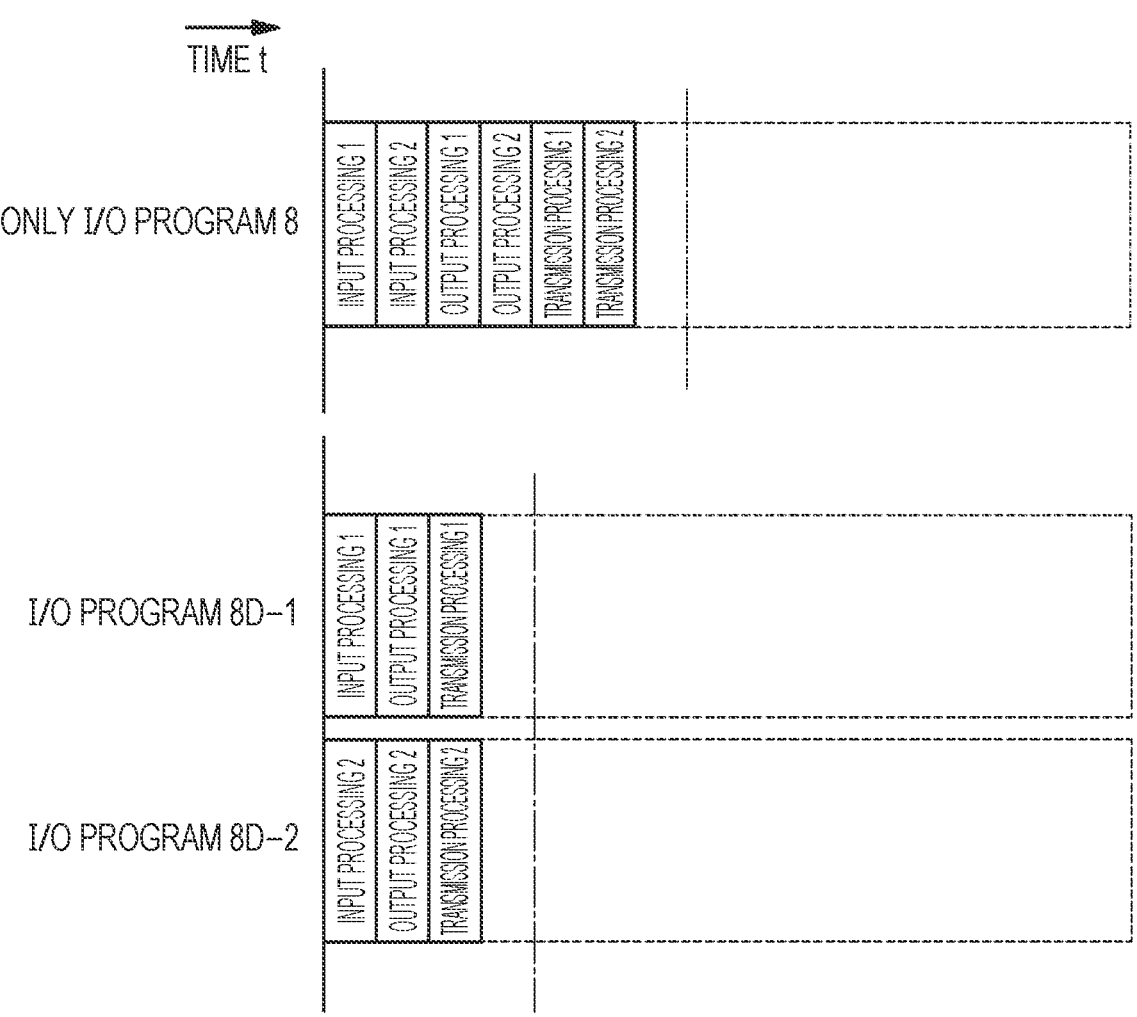
FIG. 39 is a table illustrating an example of execution timings of I/O programs in a case where one I/O node is used and in a case where two I/O nodes (normal operation, standby) according to the fourth embodiment of the present invention are used.

FIG. 39 illustrates an example of the execution timing of each of the I/O programs in a case where one I/O node is used and in a case where two I/O nodes (normal operation, standby) according to the fourth embodiment are used.

FIG. 39 illustrates an example in which a configuration using one I/O node (one I/O program 8) and a state of processing in two I/O programs in a case where scale-out is performed using this configuration are illustrated in time series. For example, as illustrated, when a total of six types of processing including two types of input processing 1 and 2, output processing 1 and 2, and transmission processing 1 and 2 are performed, three types of processing can be performed using two I/O programs 8D-1 and 8D-2. This makes it possible to shorten the control period. Alternatively, an I/O node with lower performance can perform control in an equivalent control period.

First Modification of Fourth Embodiment

Alternatively, the present embodiment can also be used to shorten a substantial control period as viewed from the device by executing the same processing at different control period timings.

Figure 40:
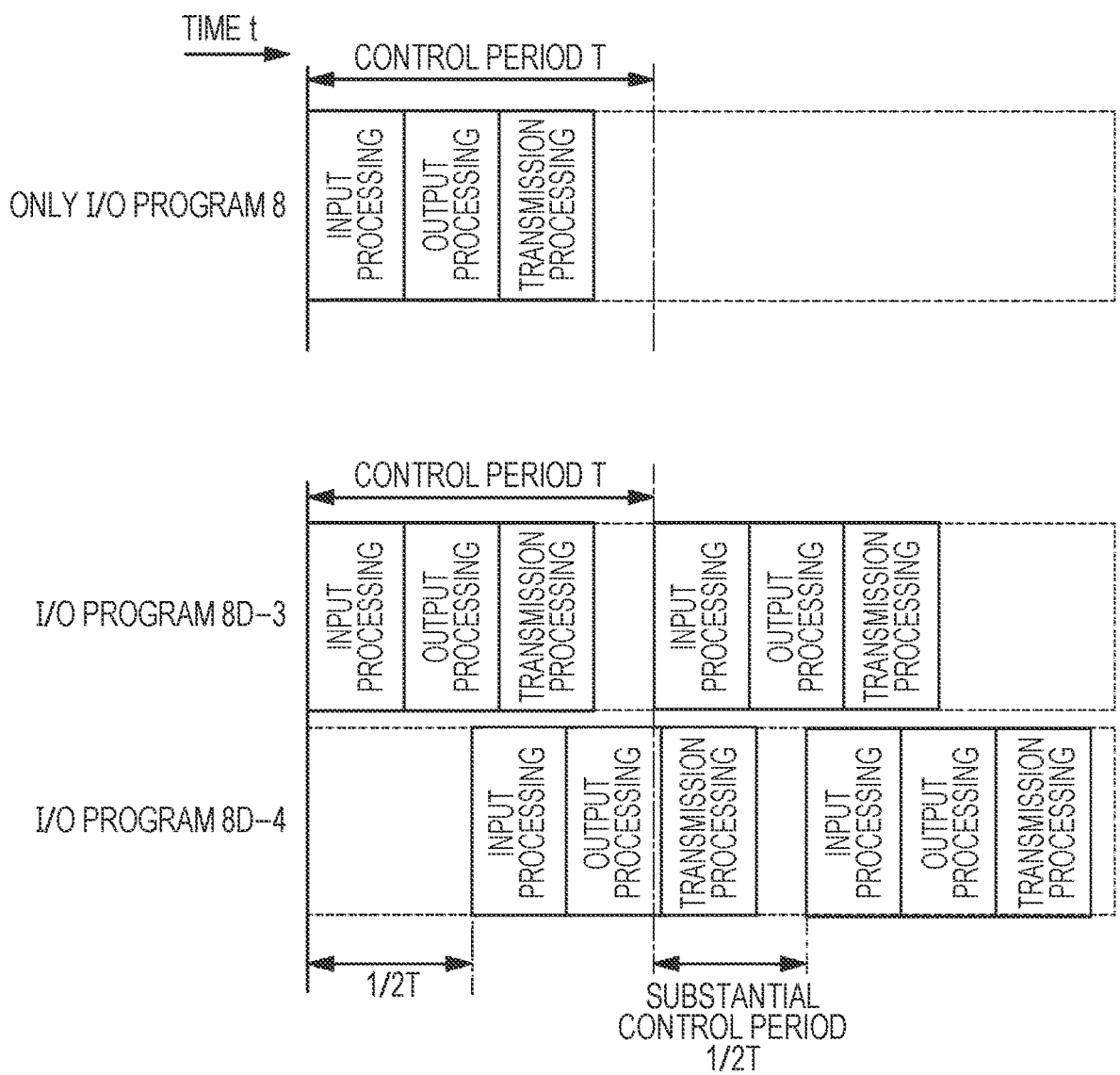
FIG. 40 is a table illustrating an example of the execution timing of each of the I/O programs in a case where one I/O node is used and in a case where a control period is shifted using two I/O nodes (normal operation, standby) according to the fourth embodiment of the present invention.

FIG. 40 illustrates an example of the execution timing of each I/O program in a case where one I/O node is used and in a case where the control period is shifted using two I/O nodes (normal operation, standby) according to the fourth embodiment.

FIG. 40 is an example in which a configuration using one I/O node (one I/O program 8) and a state of processing in two I/O programs when scale-out with a shifted control period is performed using this configuration are illustrated in time series. As illustrated, a case where the start timing of the control period of the I/O program 8D-4 is delayed by ½T with respect to the I/O program 8D-3, and the I/O programs 8D-3 and 8D-4 are both operated by the control command T will be considered. Although both the I/O programs have the control period T, when viewed from the control target device 4, the same processing is performed every ½T, and thus, it is possible to realize control equivalent to that in a case where the control is executed in the control period ½T.

In the case of performing this configuration, at the start of execution of the control system, a control command having a setting process for shifting the start timing is transmitted to the I/O program 8D-4 by the control period setting column 73m (FIG. 3). Further, a control program 7D for transmitting the same control command to the I/O programs 8D-3 and 8D-4 is created.

In the example of FIG. 38, only one control program 7D exists on the network 5, but a plurality of control programs 7D may actually exist. In addition, the configurations described in the first to third embodiments and the present embodiment can be used in combination.

As described above, the control system (control system 100D) according to the fourth embodiment connects at least two I/O nodes (I/O nodes 2D-1 and 2D-2) to the control target device so that information can be simultaneously acquired and operated, and causes one of the plurality of I/O nodes to operate as a normal system and another I/O node to operate as a standby system.

In addition, in the control system (control system 100D) according to the fourth embodiment, at least two I/O nodes (I/O nodes 2D-1 and 2D-2) are connected to the same control target device in a state where control periods thereof are synchronized. The control system is configured such that a determination execution unit (for example, determination execution unit 70) of a control program divides a control content to be executed into at least two control commands and describes the control content, and transmits the control commands in which the control content is divided to each I/O node connected to the control target device.

In addition, in the control system (control system 100D) according to the fourth embodiment, at least two I/O nodes (I/O nodes 2D-1 and 2D-2) are connected to the same control target device in a state where control periods thereof are synchronized. This control system is configured such that the determination execution unit (for example, the determination execution unit 70) of the control program (control program 7D) generates a control command having the same control content in which start timings in control command execution units (control command execution units 80D-1 and 80D-2) of I/O programs (I/O programs 8D-1 and 8D-2) in each I/O node are set to be shifted for each I/O program within a range of a control period, and transmits the control command to each of two or more I/O nodes connected to a control target device, and the control command execution unit of the I/O program in each I/O node executes the control command at the set start timing.

The present invention is not limited to the embodiments described above, and it goes without saying that various other application examples and modifications can be taken without departing from the gist of the present invention described in the claims.

For example, the above-described embodiments describe the configurations of the control system in detail and specifically in order to describe the present invention in an easy-to-understand manner, and are not necessarily limited to those having all the described components. Further, some of the configurations of an embodiment can be replaced with the components of another embodiment. In addition, the component of another embodiment can be added to the configuration of an embodiment. Further, it is possible to perform addition/replacement/deletion on other components with respect to some of the configurations of each embodiment.

In addition, some or all of the above-described configurations, functions, processing units, and the like may be realized by hardware, for example, by designing with an integrated circuit. A column programmable gate array (FPGA), an application specific integrated circuit (ASIC), or the like may be used as the hardware.

Furthermore, in the flowcharts illustrated in the respective drawings, a plurality of processes may be executed in parallel or the processing order may be changed within a range not affecting the processing result.

Further, in the above-described embodiments, control lines or information lines are illustrated as necessary for explanation, and all the control lines or information lines are not necessarily illustrated on products. In practice, it may be considered that almost all the components are connected to each other.

REFERENCE SIGNS LIST 1 control node
2 I/O node
3 HMI node
4 control target device
5 network
6 cable
7 control program
8 I/O program
9 HMI program
10 CPU
11 storage device
12 network interface
13 memory
14 general-purpose OS
15 configuration management program
15A master selection unit
15B program arrangement unit
15C abnormality monitoring unit
15D program registration unit
15E table synchronization unit
15F control program management table
15G control node management table
20 CPU
21 storage device
22 network interface
23 memory
24 real-time OS
25 I/O interface
30 CPU
31 storage device
32 network interface
33 memory
34 general-purpose OS
35 user interface
40 sensor
41 actuator
70 determination execution unit
71 reception processing unit
72 transmission processing unit
73 control command
80 control command execution unit
81 reception processing unit
82 transmission processing unit
83 transmission data
84 command switching unit
85 input processing unit
86 output processing unit
87 transmission source list
88 time synchronization unit
89 scale-out configuration table
90 switching signal transmission screen
91 control program registration screen
92 control node abnormality warning screen
93 scale-out configuration setting screen
100, 100B, 100C, 100D control system

The invention claimed is:

1. A control system comprising:
at least one control node; and
at least one I/O node that is connected to one or more control target devices and is communicable with the control node via a network,
wherein the control node includes a first operating system and a first processor that executes at least one control program on the first operating system,
the I/O node includes a second operating system having higher punctuality than the first operating system, and a second processor that executes at least one I/O program on the second operating system, and
the control program of the control node includes a determination execution unit that generates a control command based on state control set in advance for the control target device and transmits the control command to the I/O node, and
the I/O program of the I/O node includes a control command execution unit that stores the control command received from the control node in a storage unit and executes processing related to the control target device according to the control command stored in the storage unit.

2. The control system according to claim 1,
wherein in a case where a plurality of the control commands are stored in the storage unit, the control command execution unit executes processing prescribed in the control command in descending order of priority among the plurality of control commands along a control period, and in a case where the processing of the control command is not completed within the control period, the control command execution unit stops the processing of the control command at a time point when the control period is exceeded.

3. The control system according to claim 1,
wherein the I/O program includes a command switching unit that selects a control command to be executed from a plurality of the control commands received from a plurality of the control programs, and
the command switching unit selects a control command generated by a control program after switching among the plurality of control programs, and transmits the control command to the control command execution unit.

4. The control system according to claim 1,
wherein the I/O program includes a command switching unit that selects a control command to be executed from a plurality of the control commands received from a plurality of the control programs,
the control program is executed on at least two of the control nodes, and
the command switching unit sends only the control command received from the control node to the control command execution unit.

5. The control system according to claim 1,
wherein the I/O program includes a command switching unit that selects a control command to be executed from a plurality of the control commands received from a plurality of the control programs,
the control program is executed on at least three of the control nodes, and
the command switching unit compares control contents of the control commands received at the same timing, and in a case where control commands having different control contents are included, the command switching unit selects the control command having a large number of matching control contents and sends the control command to the control command execution unit.

6. The control system according to claim 4,
wherein each control node includes a configuration management program,
the configuration management program includes
a master selection unit that selects the control node operating in a master state from a plurality of the control nodes and sets its own control node to a slave state, sets its own control node to the master state when the control node in the master state does not exist, and transmits information on its own control node to other control nodes,
an information synchronization unit that synchronizes information on each control node in the control node in a master state and the control node in a slave state with a control node management table included in each control node,
a program registration unit that receives information on the control program and information on a redundant configuration setting designated by a user interface,
a program arrangement unit which, when a redundant configuration is requested, refers to the control node management table to determine two or more of the control nodes that execute the control program in the redundant configuration and cause the determined control nodes to execute the control program, and
an abnormality monitoring unit that monitors the control node and detects an abnormality,
in the configuration management program in the master state, when the abnormality monitoring unit receives a notification of an abnormality of the control node in the slave state, the information synchronization unit excludes the control node having an abnormality from the control node management table, and
the program arrangement unit selects another control node capable of executing the control program from the control node management table and causes the selected control node to execute the control program.

7. The control system according to claim 6,
wherein in a case where there is no other control node capable of executing the control program in the control node management table,
when a new control node is connected to the network, the master selection unit detects the connection and adds information on the new control node to the control node management table, and
the program arrangement unit determines the control node added to the control node management table as the control node that executes the control program in a redundant configuration.

8. The control system according to claim 6,
wherein in the configuration management program in the slave state, when the abnormality monitoring unit detects an abnormality of the control node in the master state, the master selection unit newly sets its own control node to the master state.

9. The control system according to claim 6,
wherein a result processed by the I/O program of the I/O node is received in order by at least two of the control nodes, and
in each control node, the determination execution unit of the control program generates the control command based on the received result of the processing, and sequentially transmits the control command to the I/O node.

10. The control system according to claim 1,
wherein at least two of the I/O nodes are connected to the control object device so as to perform acquisition of information and operation thereof at the same time, and
one of the plurality of I/O nodes is operated as a normal system and another I/O node is operated as a standby system.

11. The control system according to claim 1,
wherein at least two of the I/O nodes are connected to the same control target device in a state in which control periods are synchronized, and
the determination execution unit of the control program divides a control content to be executed into at least two of the control commands, and transmits the control command in which the control content is divided to each I/O node connected to the control target device.

12. The control system according to claim 1,
wherein at least two of the I/O nodes are connected to the same control target device in a state in which control periods are synchronized,
the determination execution unit of the control program generates the control command having the same control content in which a start timing of the I/O program in each I/O node in the control command execution unit is set to be shifted for each I/O program within a range of the control period, and transmits the control command to each of two or more I/O nodes connected to the control target device, and
the control command execution unit of the I/O program executes the control command at the set start timing in each I/O node.

* * * * *